W. GRUNOW.
WINDING MACHINE.
APPLICATION FILED FEB. 23, 1918.

1,371,367.

Patented Mar. 15, 1921.
26 SHEETS—SHEET 1.

Witness
Helge Thunay

Inventor
William Grunow
By
Sturtevant & Mason
Attorneys

W. GRUNOW.
WINDING MACHINE.
APPLICATION FILED FEB. 23, 1918.

1,371,367.

Patented Mar. 15, 1921.
26 SHEETS—SHEET 3.

Witness

Inventor
William Grunow
By
Sturtevant & Mason
Attorneys

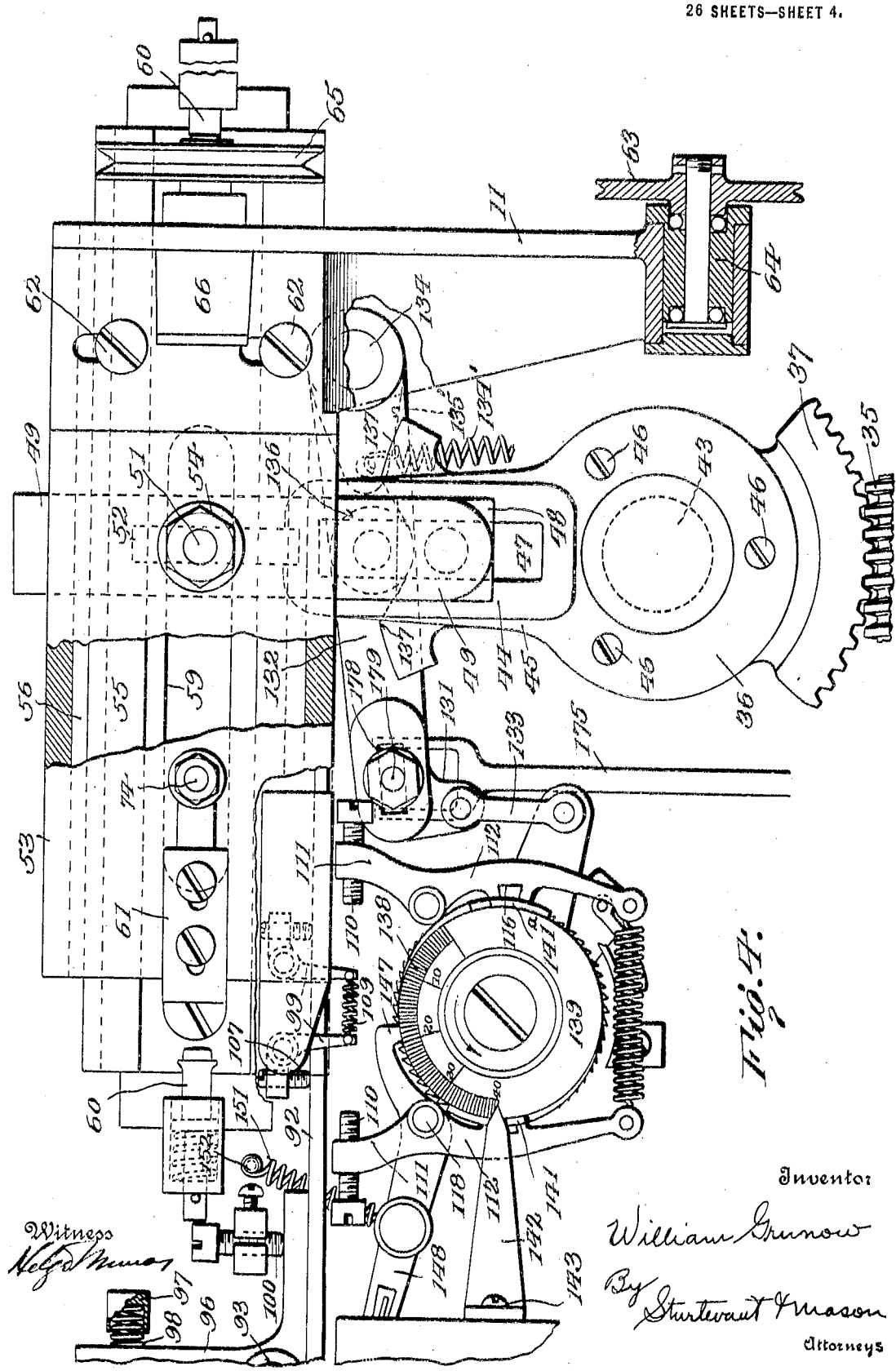

W. GRUNOW.
WINDING MACHINE.
APPLICATION FILED FEB. 23, 1918.
1,371,367.
Patented Mar. 15, 1921.
26 SHEETS—SHEET 5.
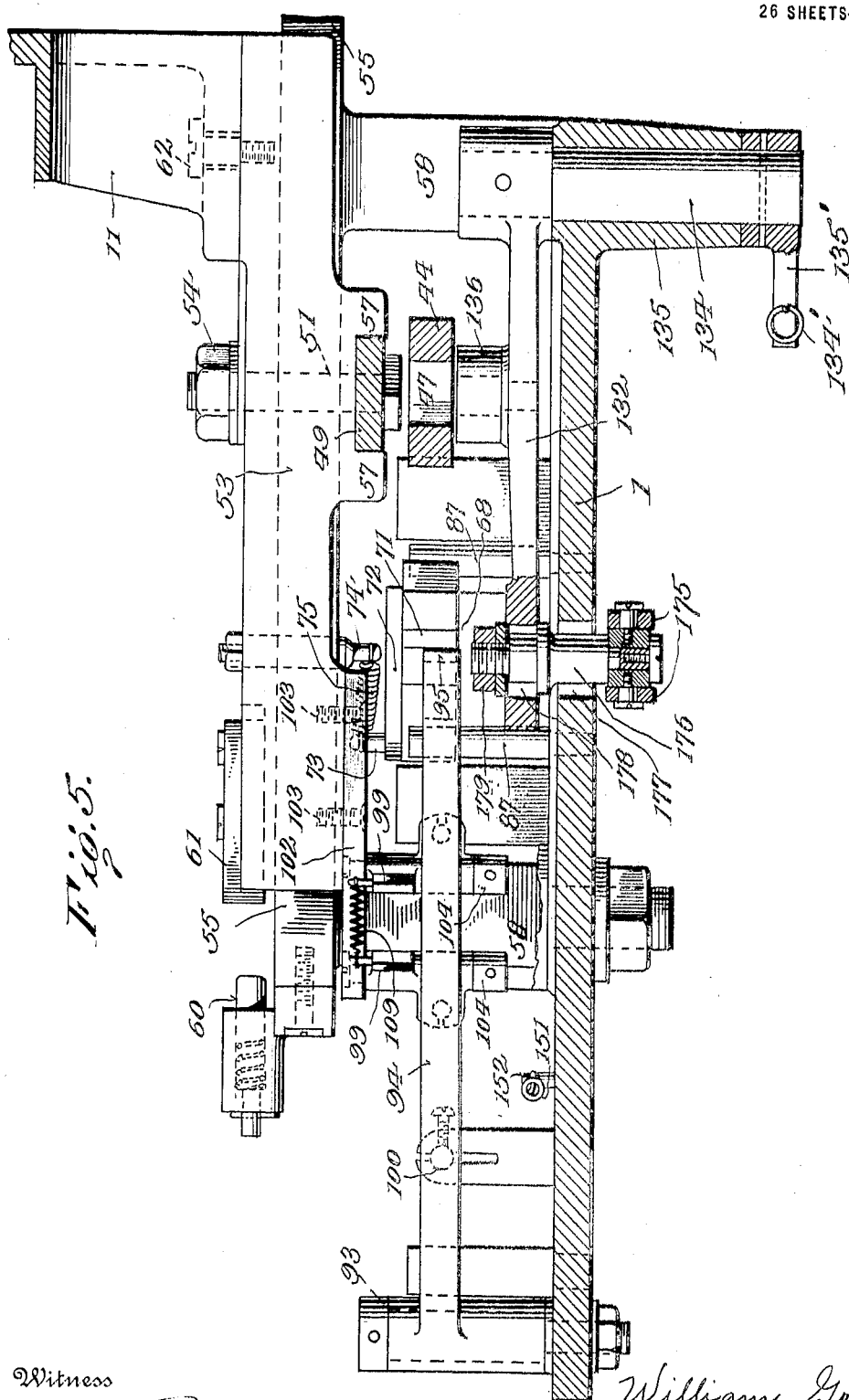

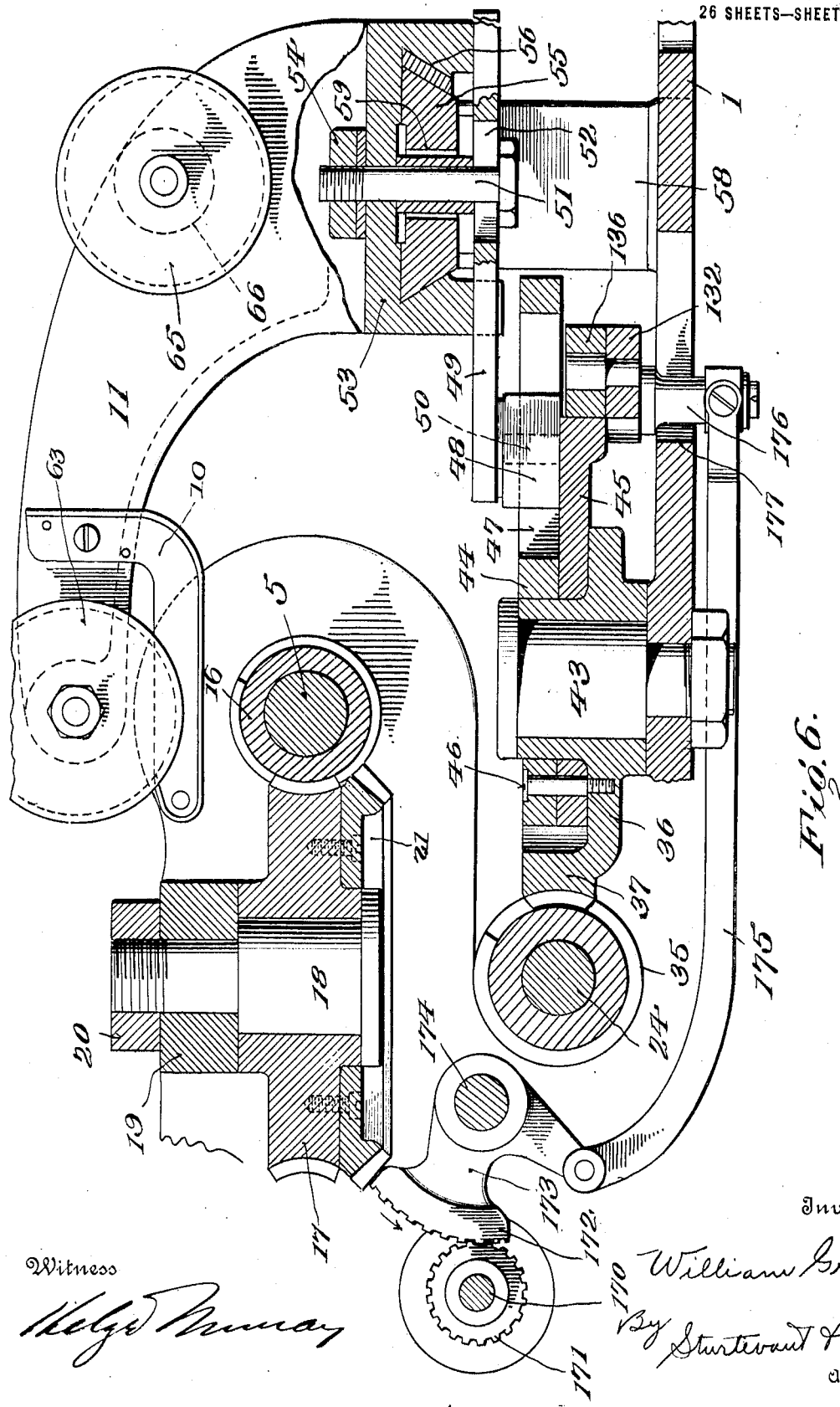

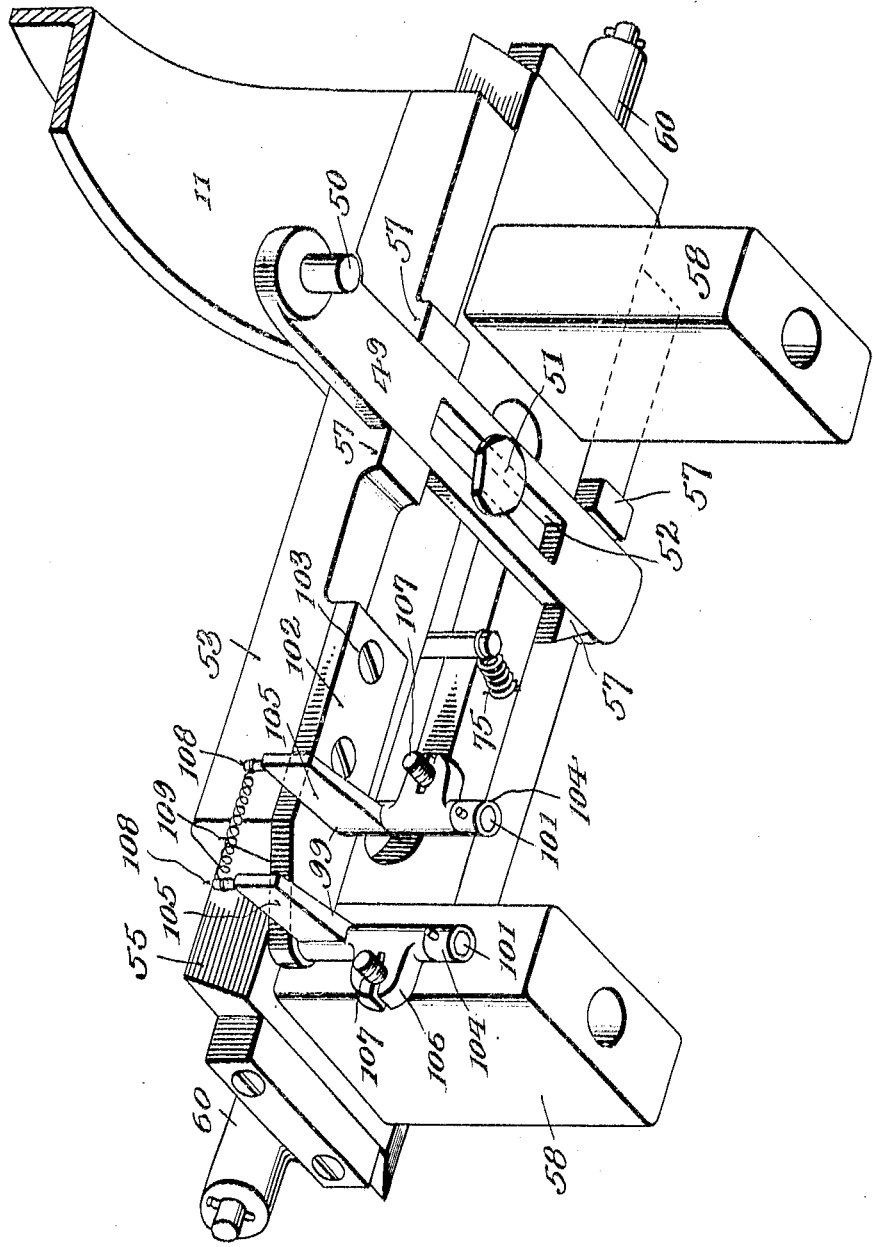

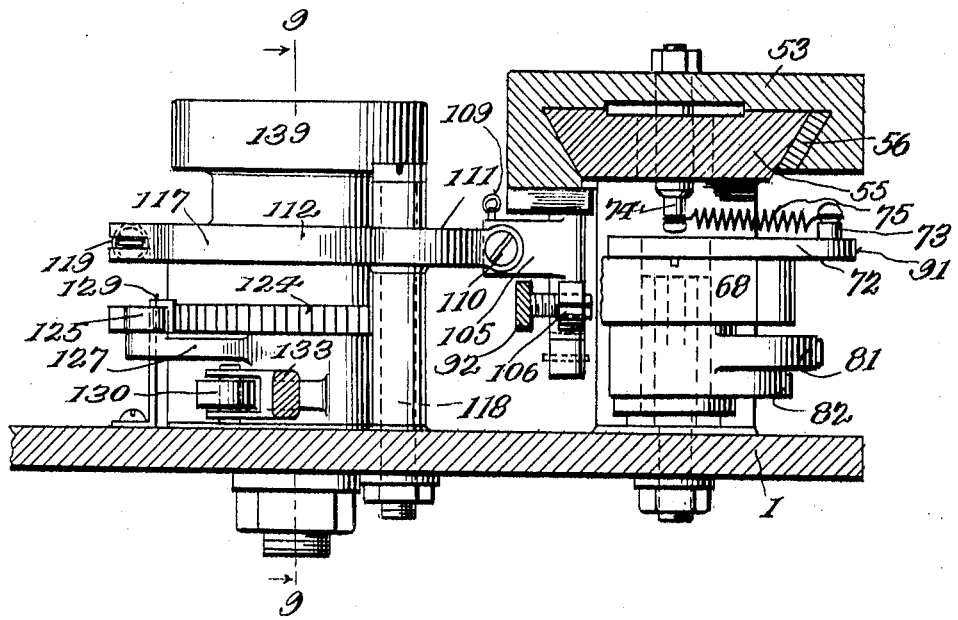
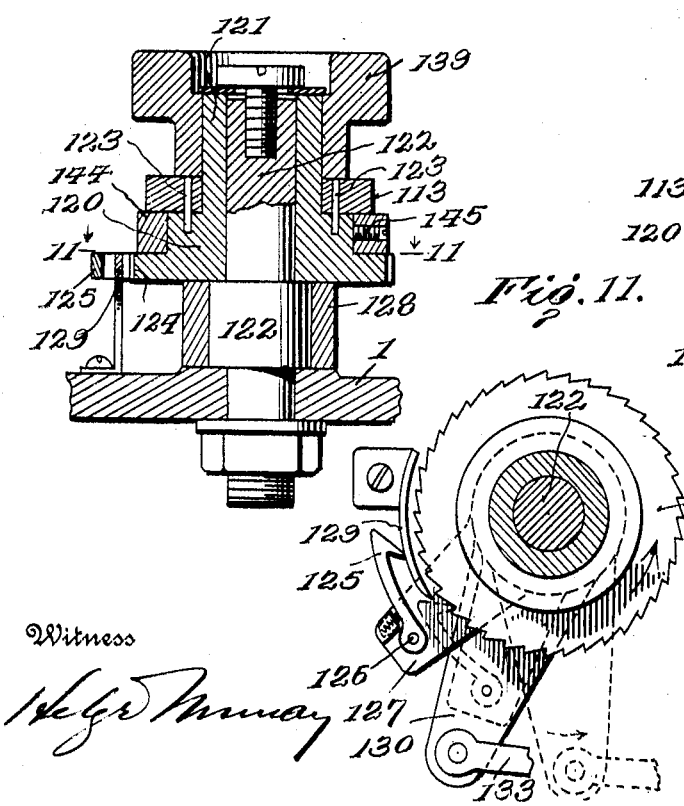
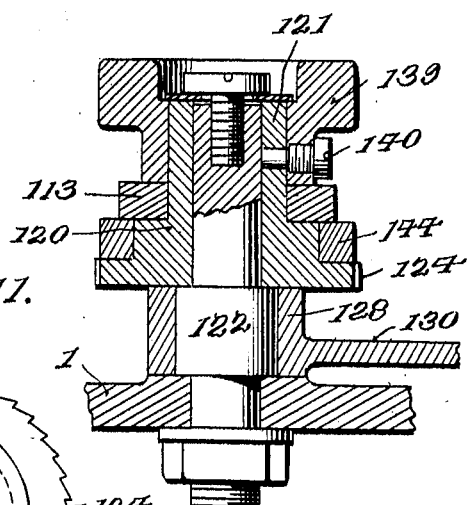

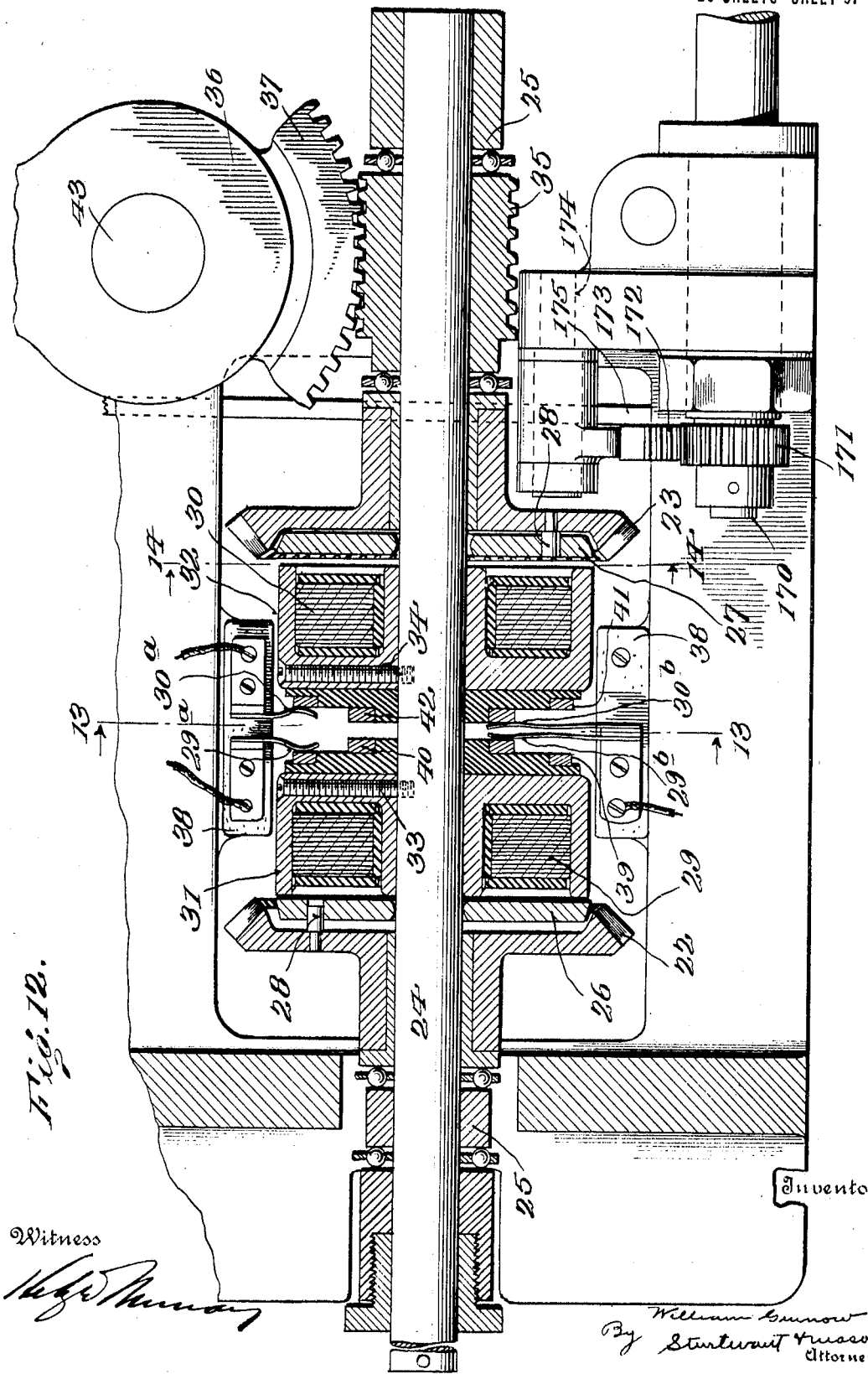

W. GRUNOW.
WINDING MACHINE.
APPLICATION FILED FEB. 23, 1918.
1,371,367.
Patented Mar. 15, 1921.
26 SHEETS—SHEET 10.
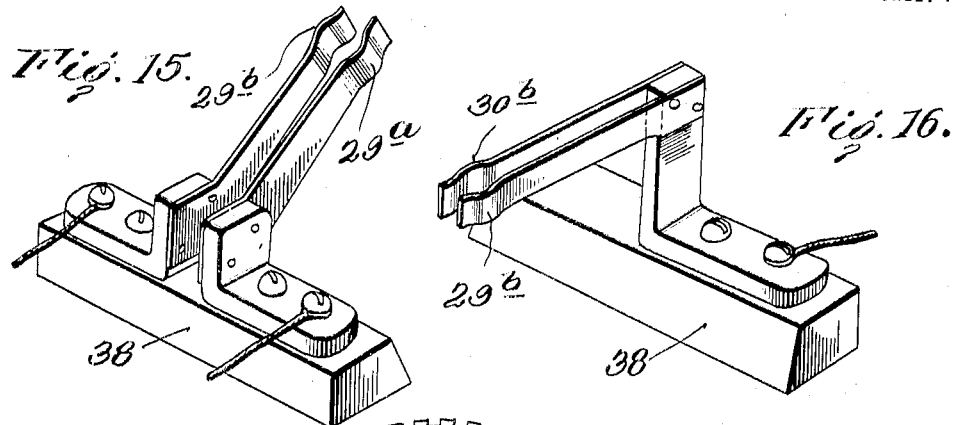
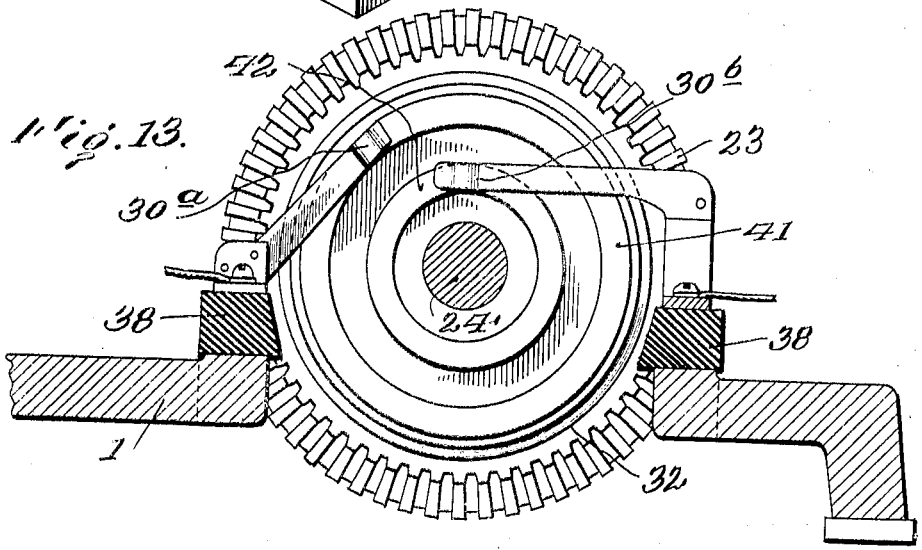
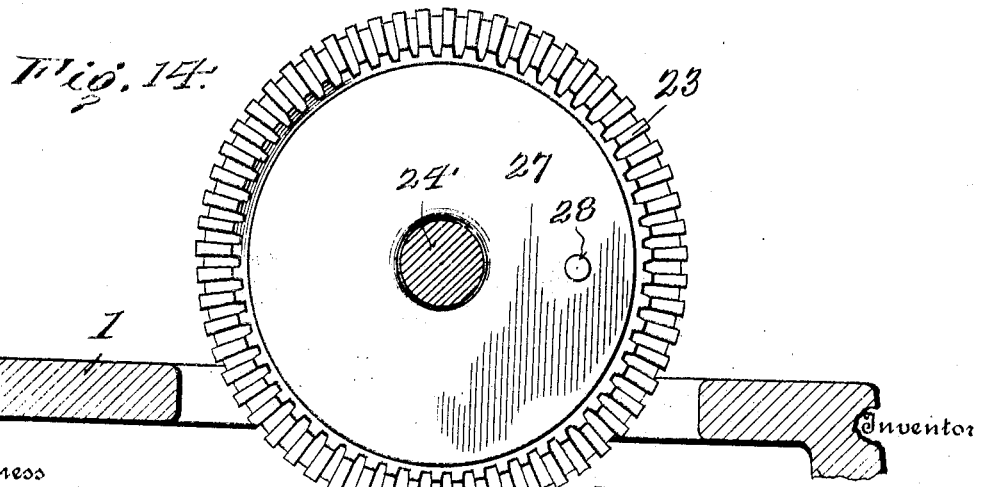
Witness
Inventor
William Grunow
By
Sturtevant & Mason
Attorneys W. GRUNOW.
WINDING MACHINE.
APPLICATION FILED FEB. 23, 1918.
1,371,367.
Patented Mar. 15, 1921.
26 SHEETS—SHEET 11.
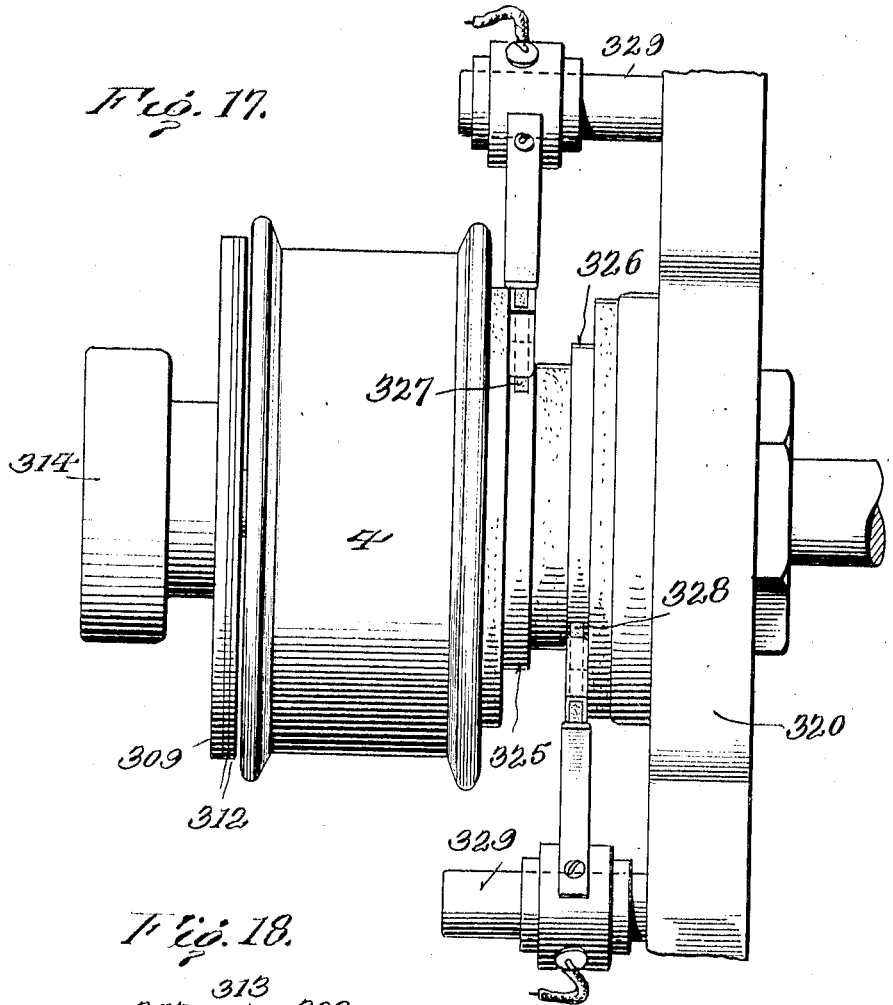
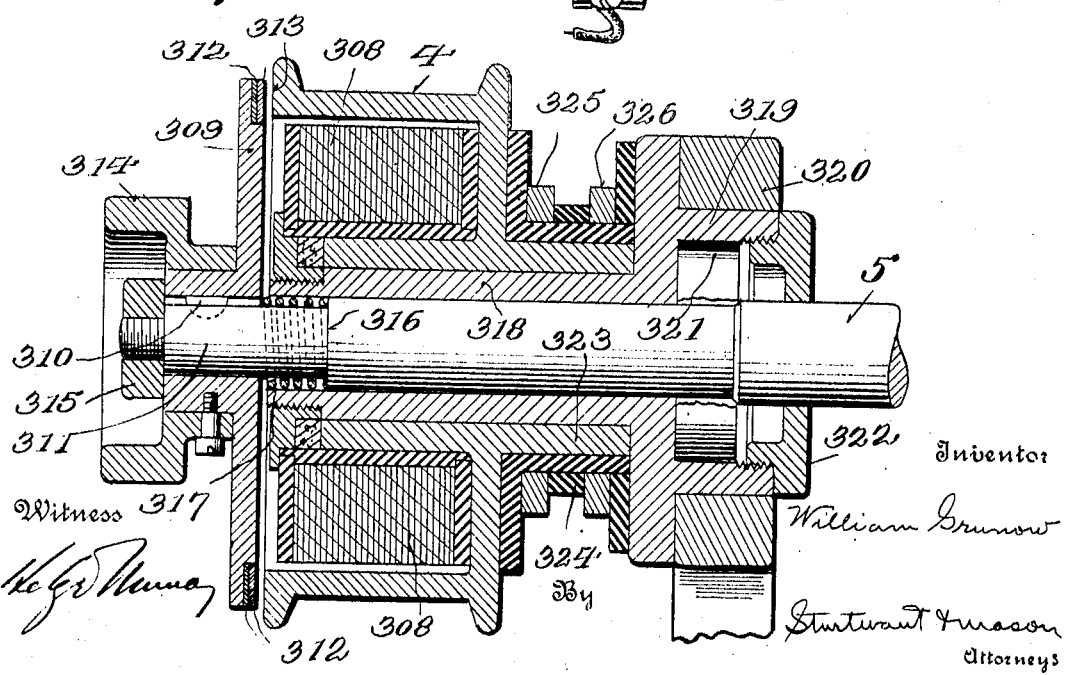

W. GRUNOW.
WINDING MACHINE.
APPLICATION FILED FEB. 23, 1918.

1,371,367.

Patented Mar. 15, 1921.
26 SHEETS—SHEET 12.

Witness

Inventor
William Grunow
Sturtevant Mason
Attorneys

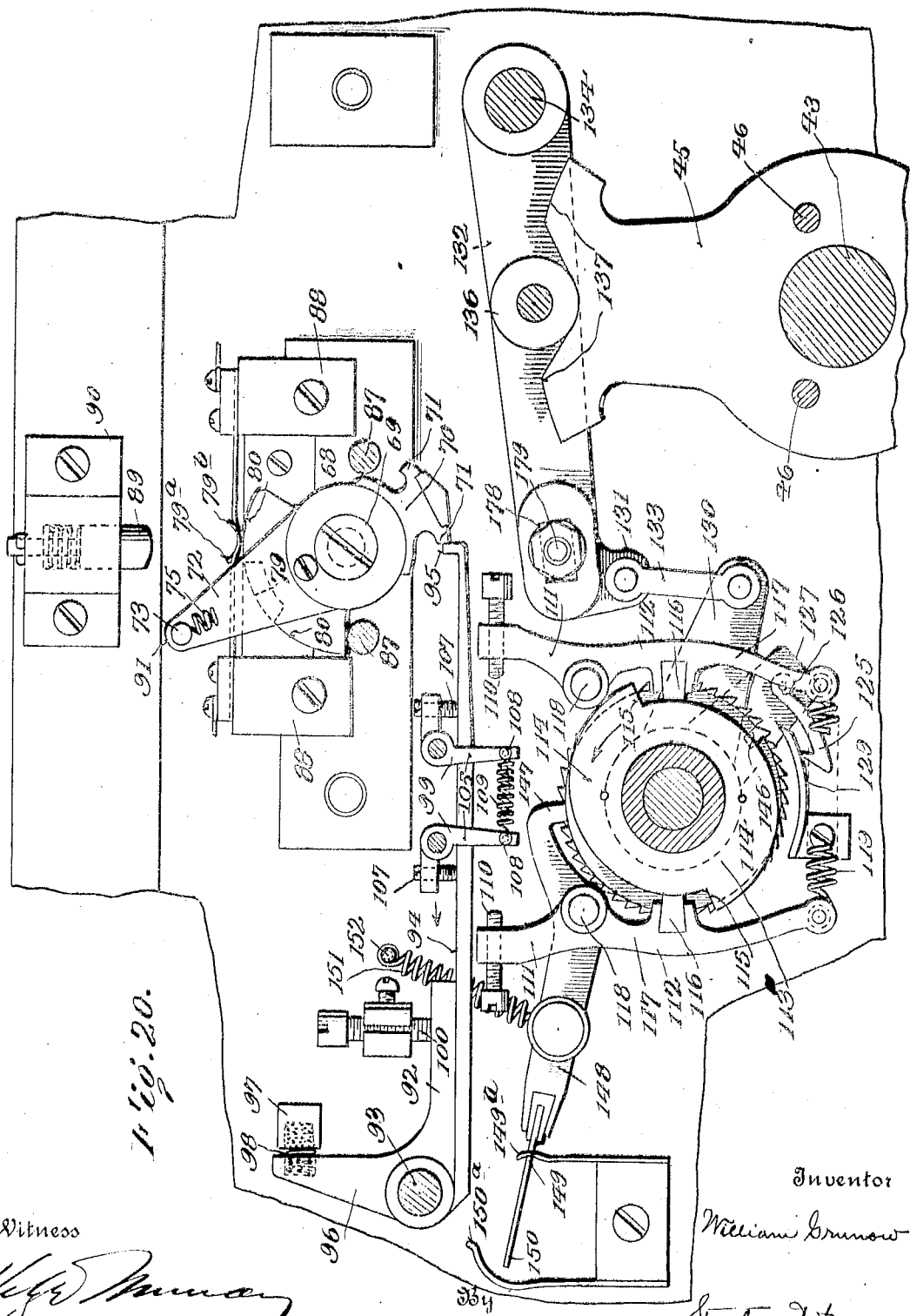

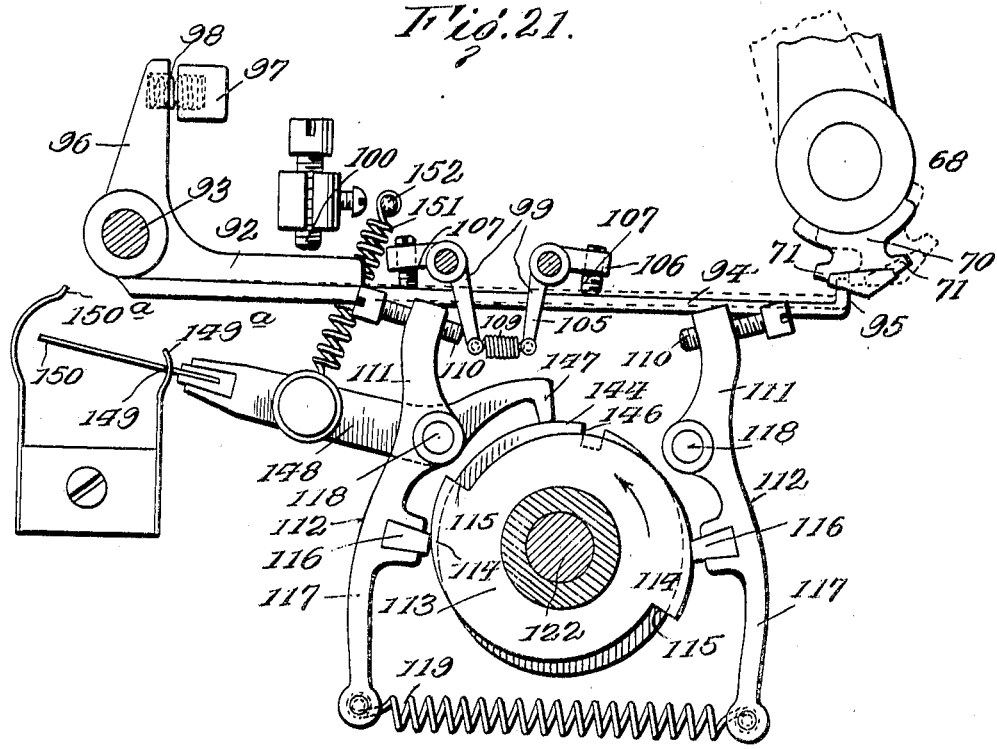
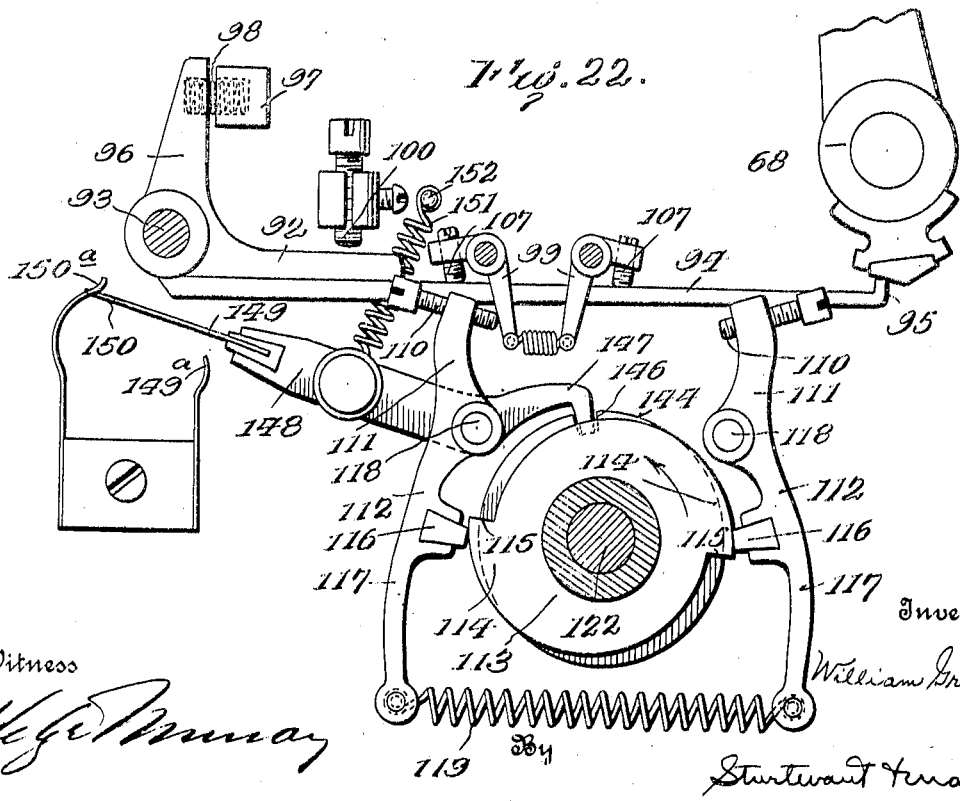

W. GRUNOW.
WINDING MACHINE.
APPLICATION FILED FEB. 23, 1918.
1,371,367.
Patented Mar. 15, 1921.
26 SHEETS—SHEET 15.
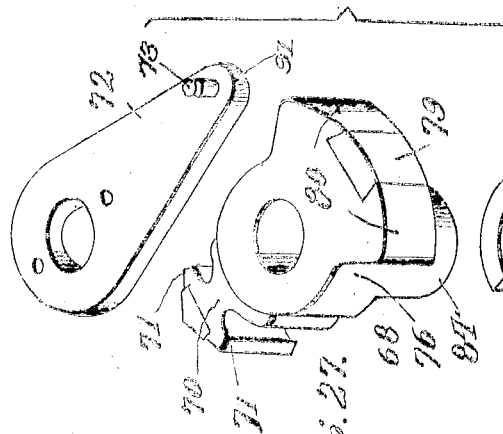
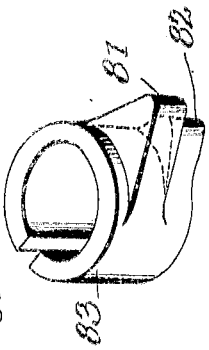
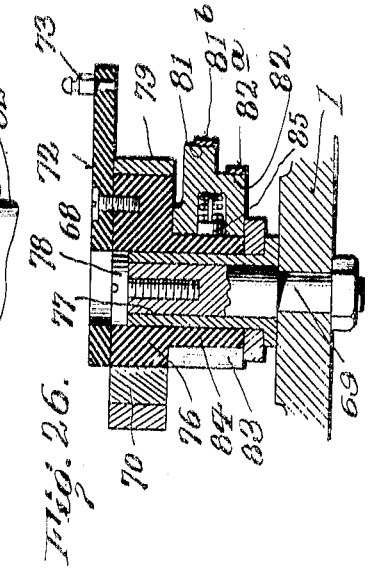
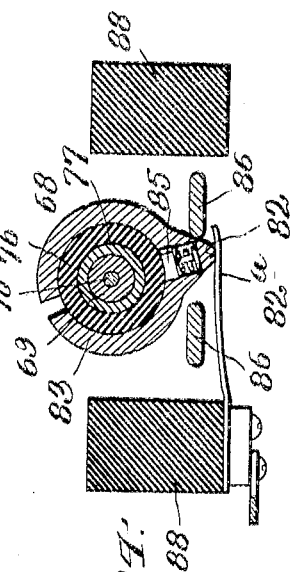
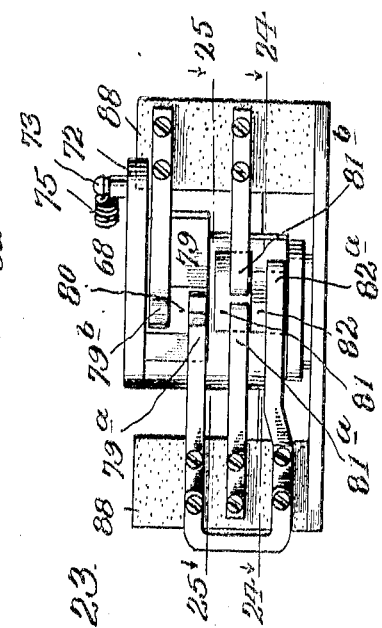
Inventor
William Grunow
By Sturtevant & Mason
Attorneys

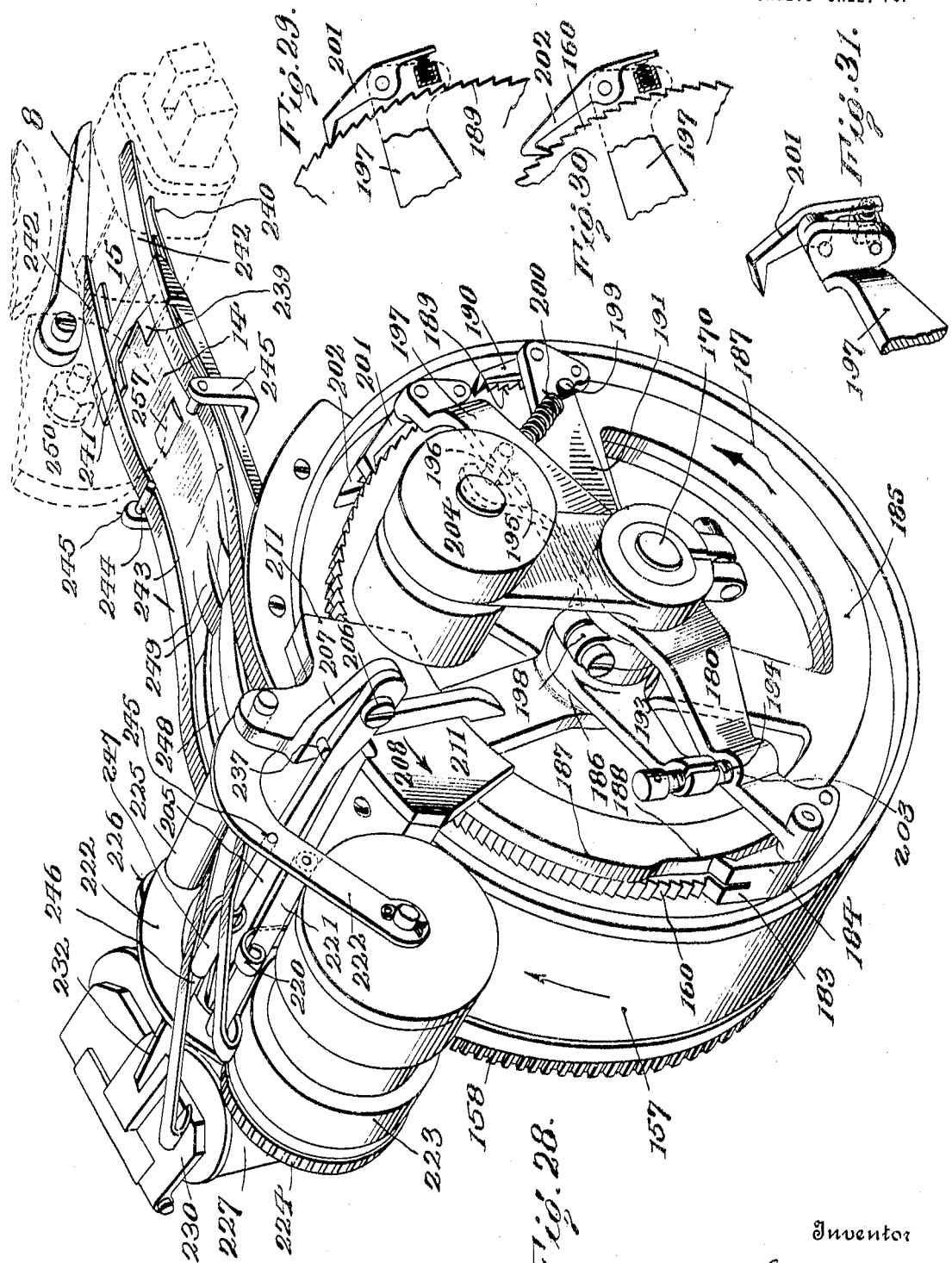

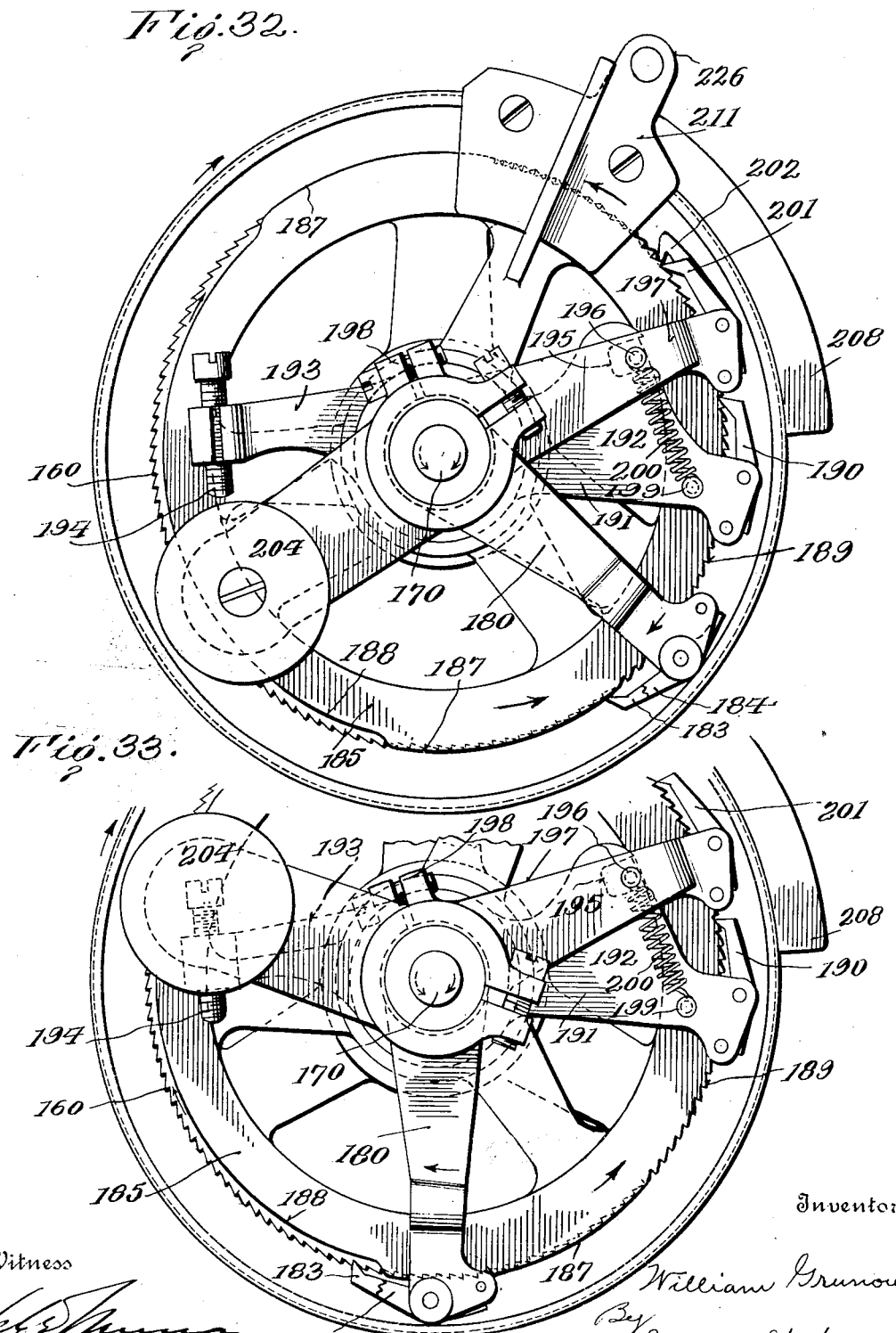

W. GRUNOW.
WINDING MACHINE.
APPLICATION FILED FEB. 23, 1918.

1,371,367.

Patented Mar. 15, 1921.
26 SHEETS—SHEET 18.

Inventor
William Grunow
By
Sturtevant & Mason
Attorneys

Witness

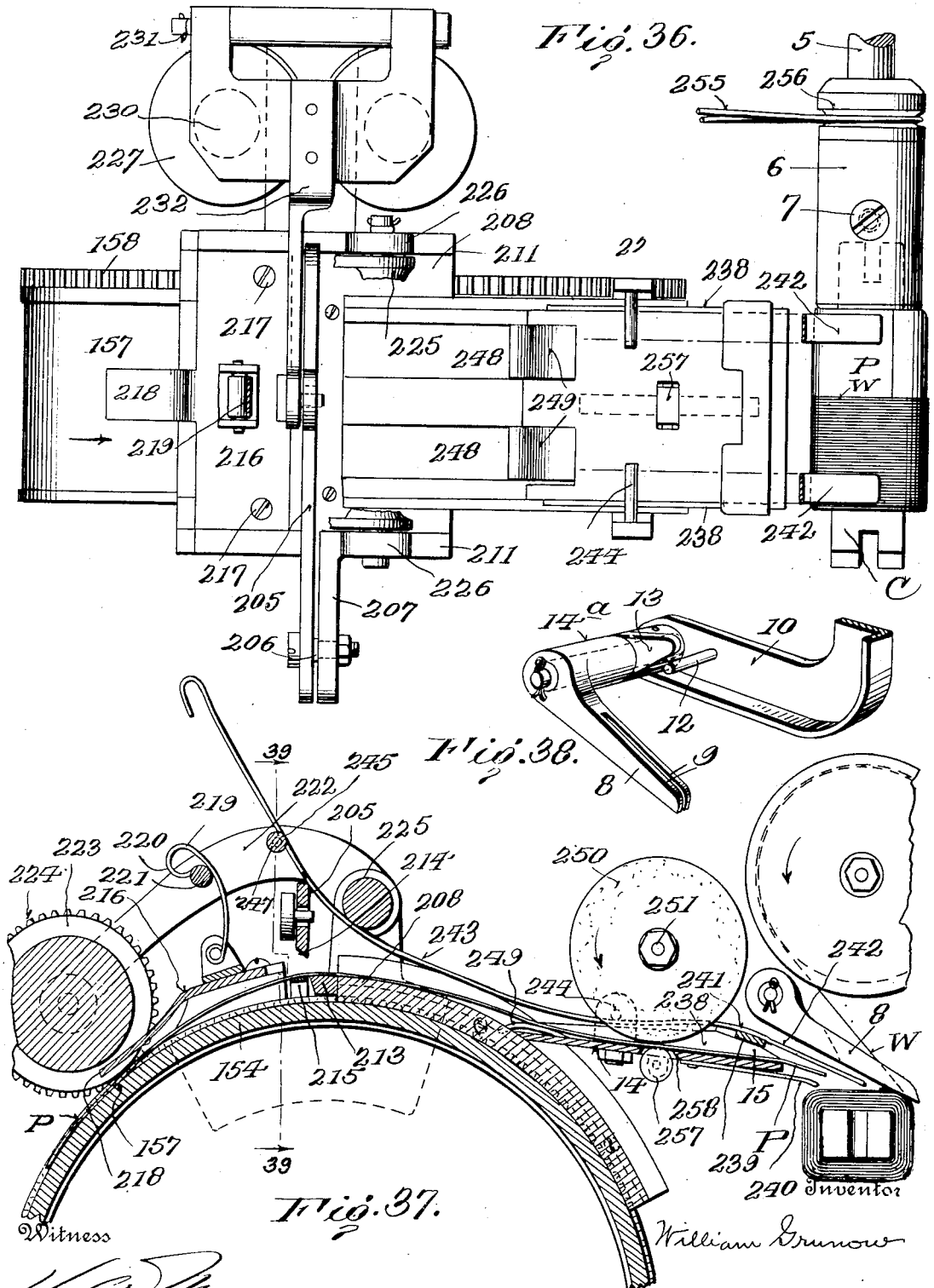

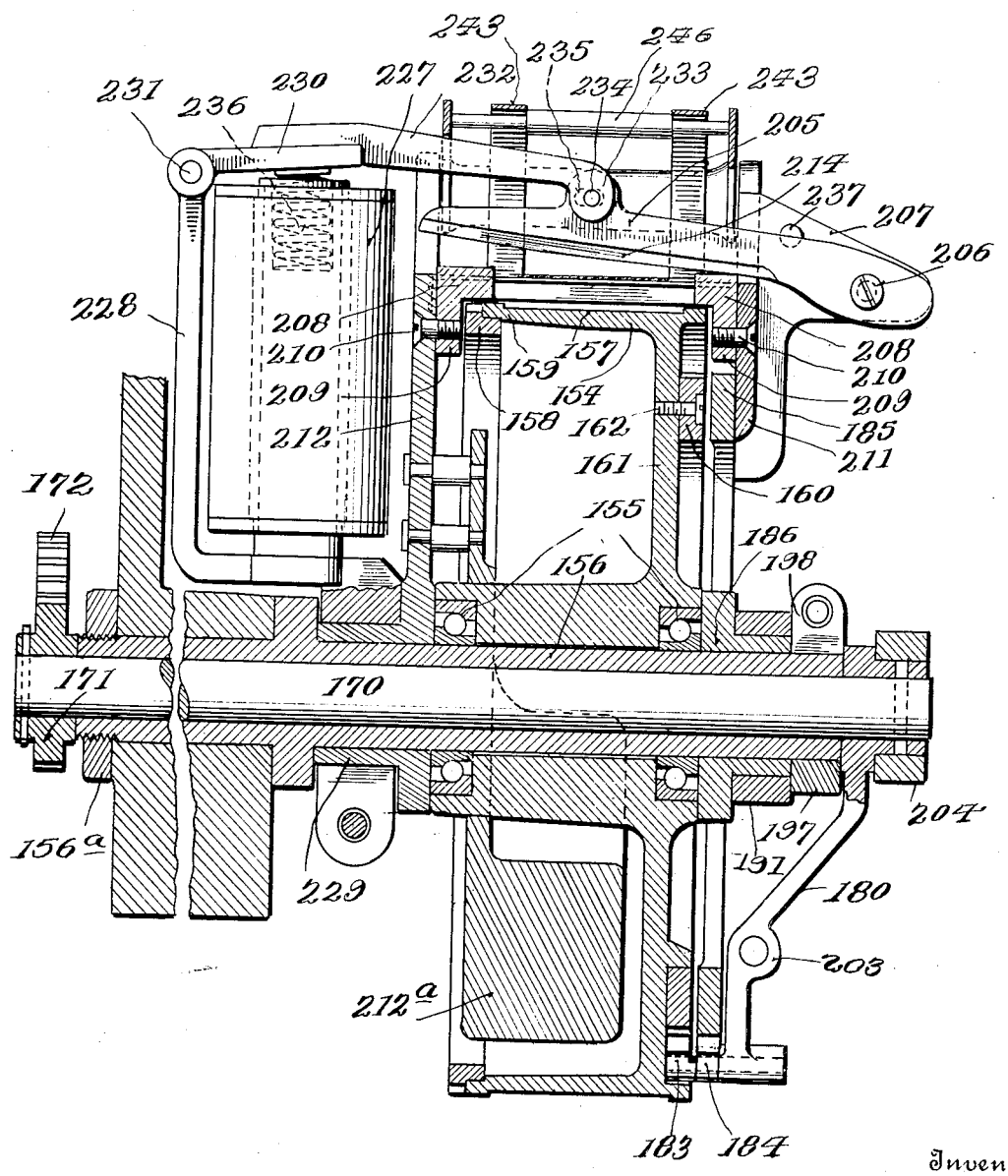

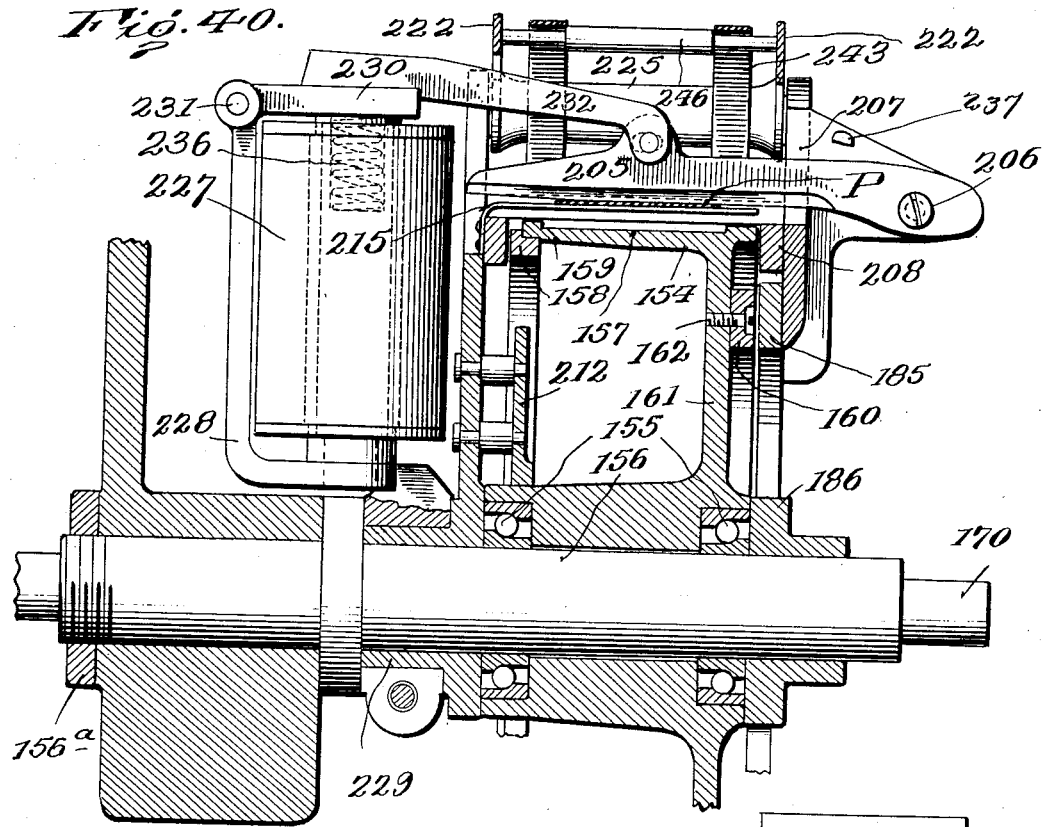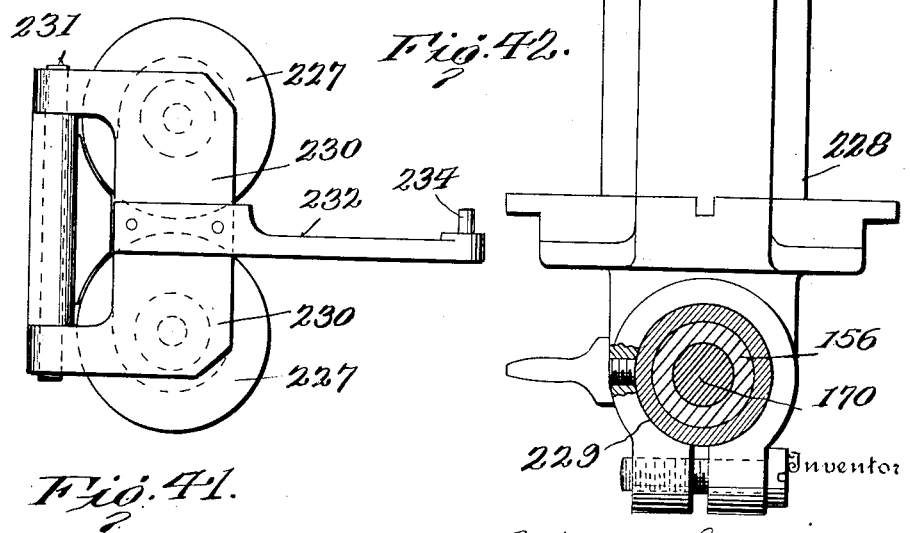

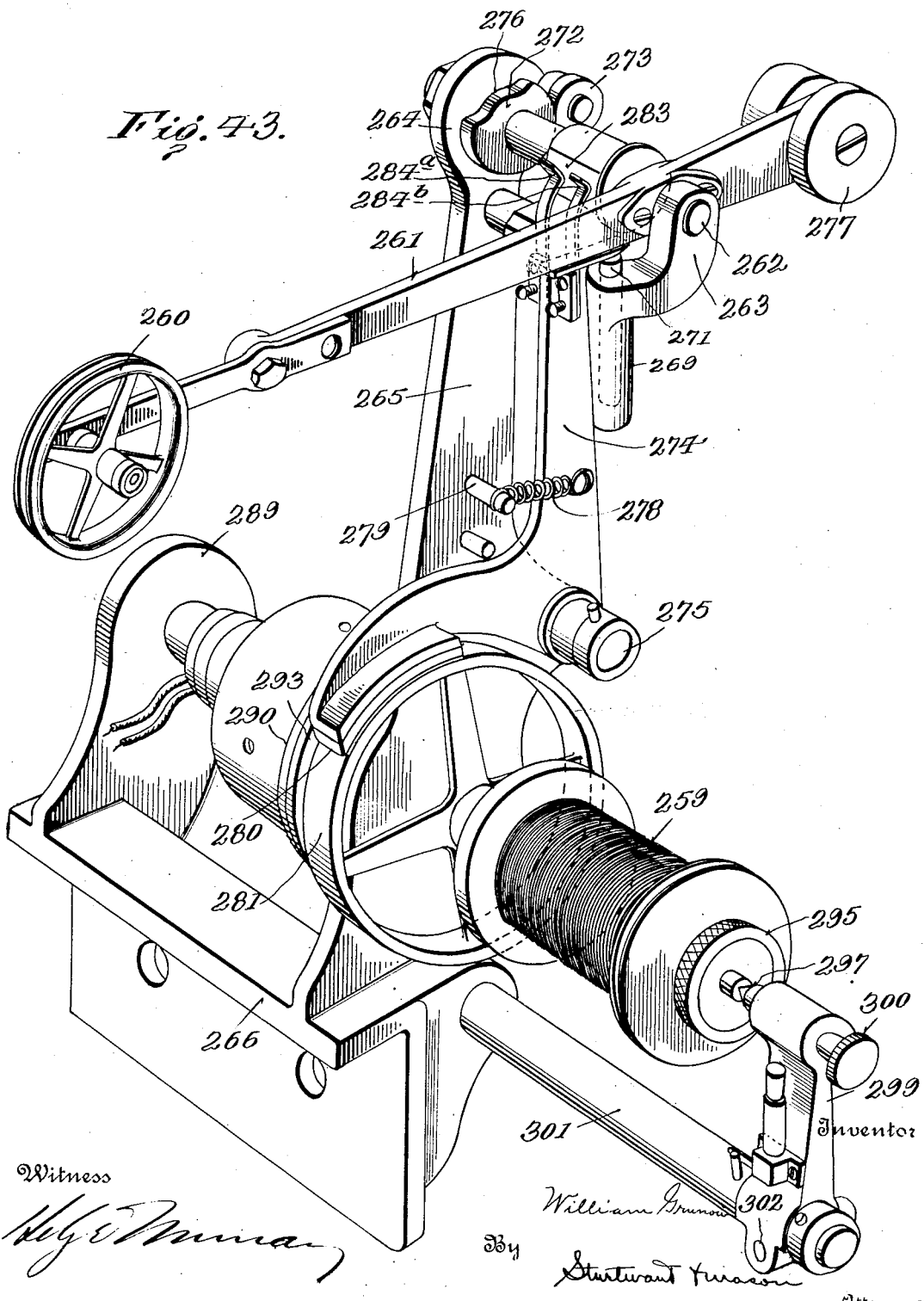

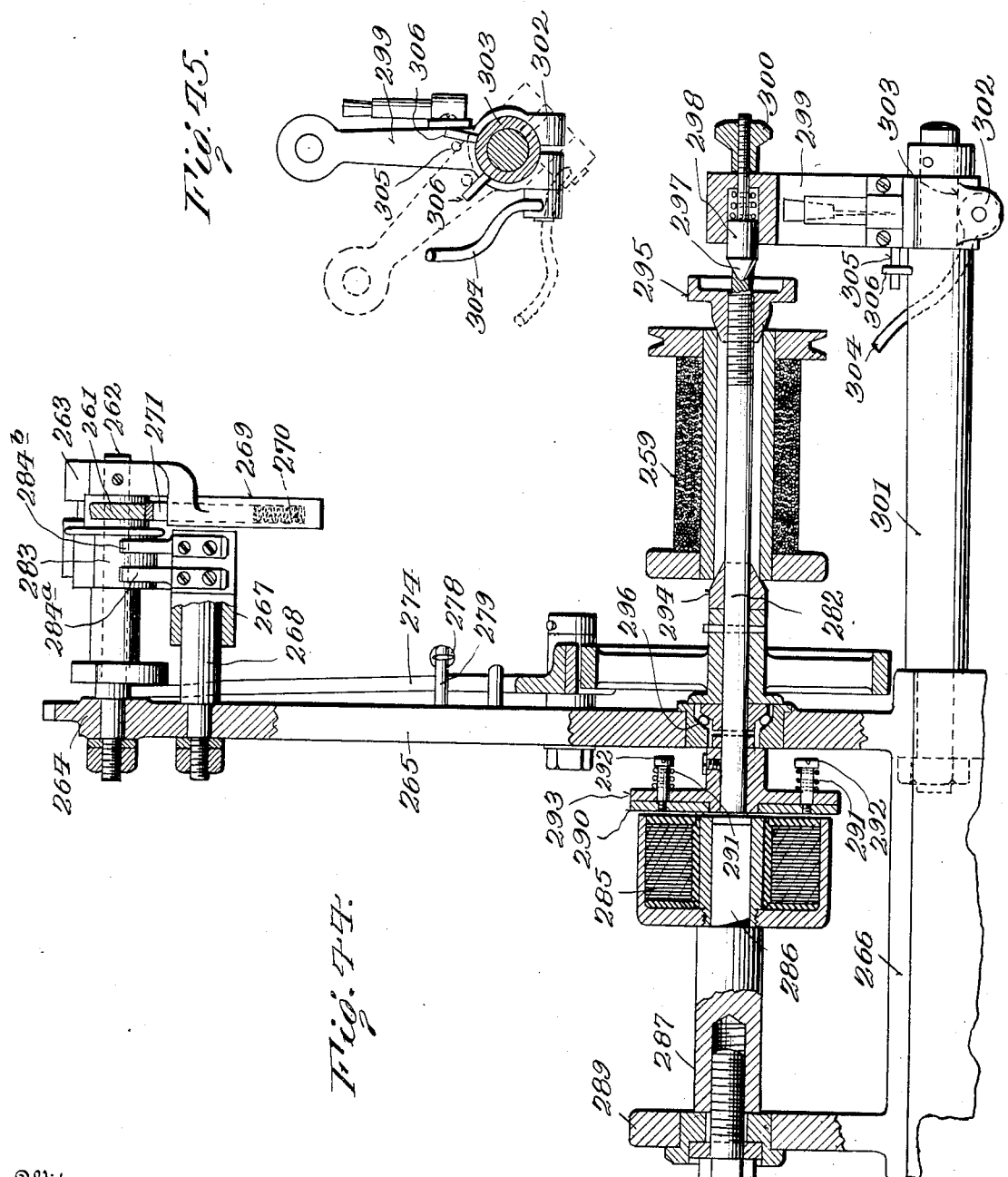

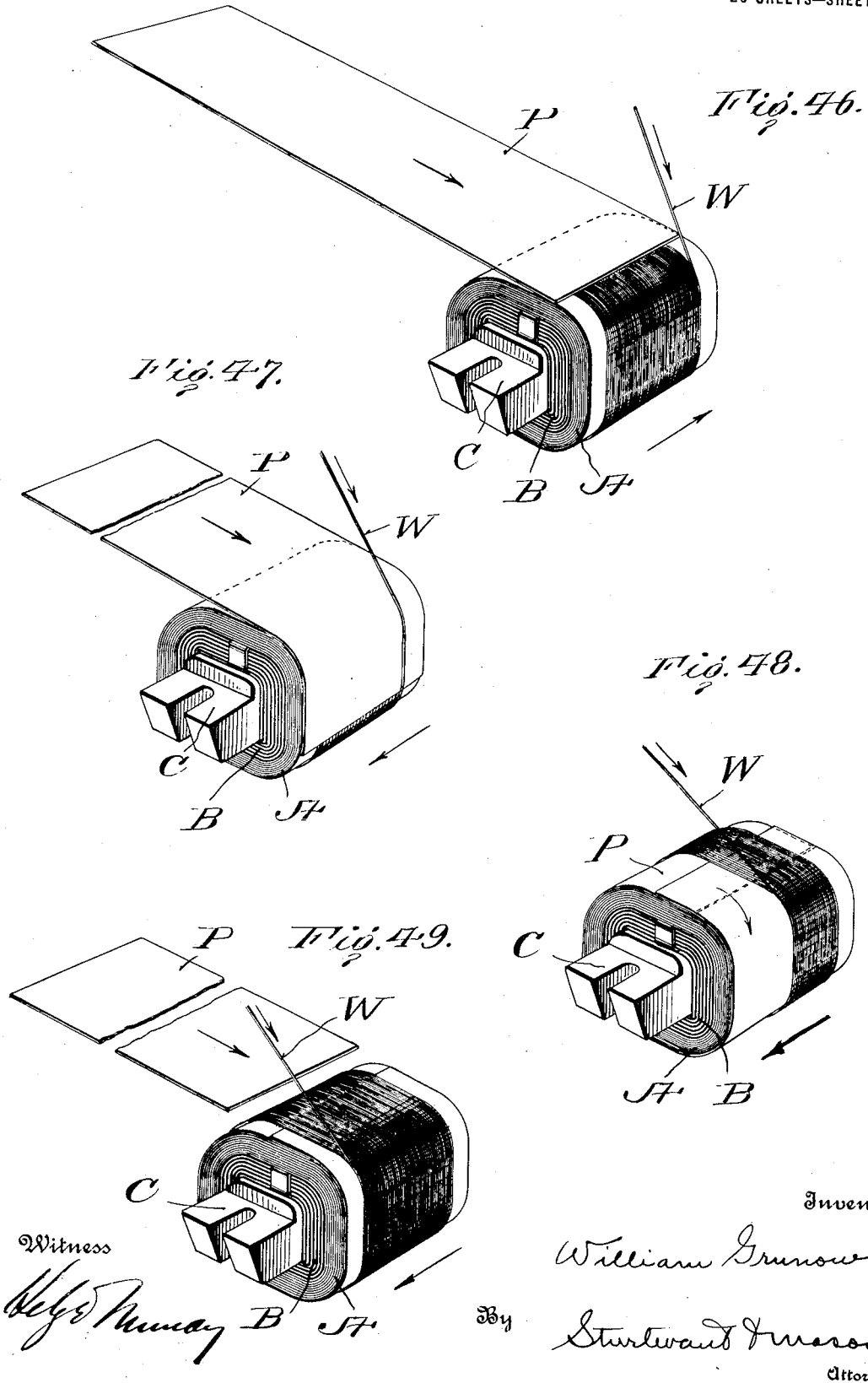

W. GRUNOW.
WINDING MACHINE.
APPLICATION FILED FEB. 23, 1918.
1,371,367.
Patented Mar. 15, 1921.
26 SHEETS—SHEET 25.
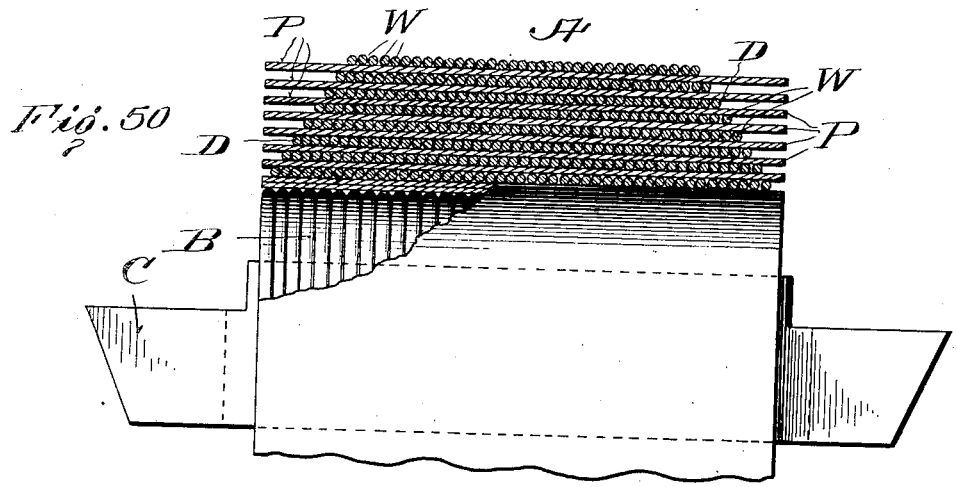
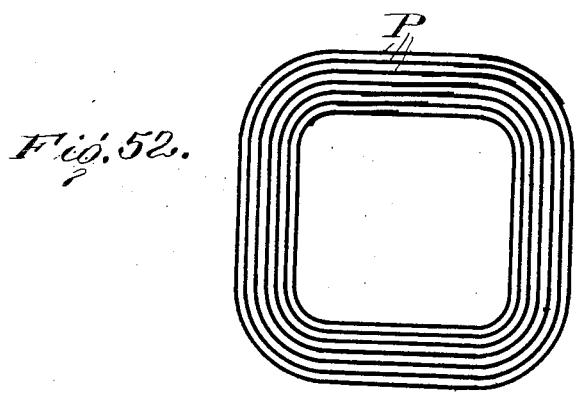
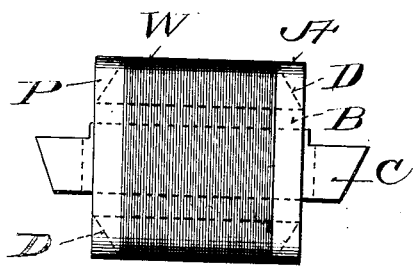
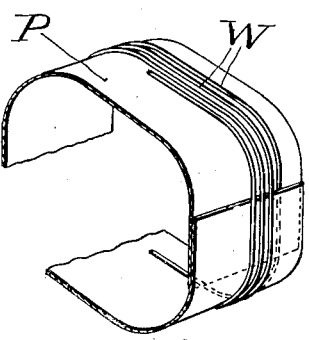
Witness
Inventor
William Grunow
By Sturtevant & Mason
Attorneys

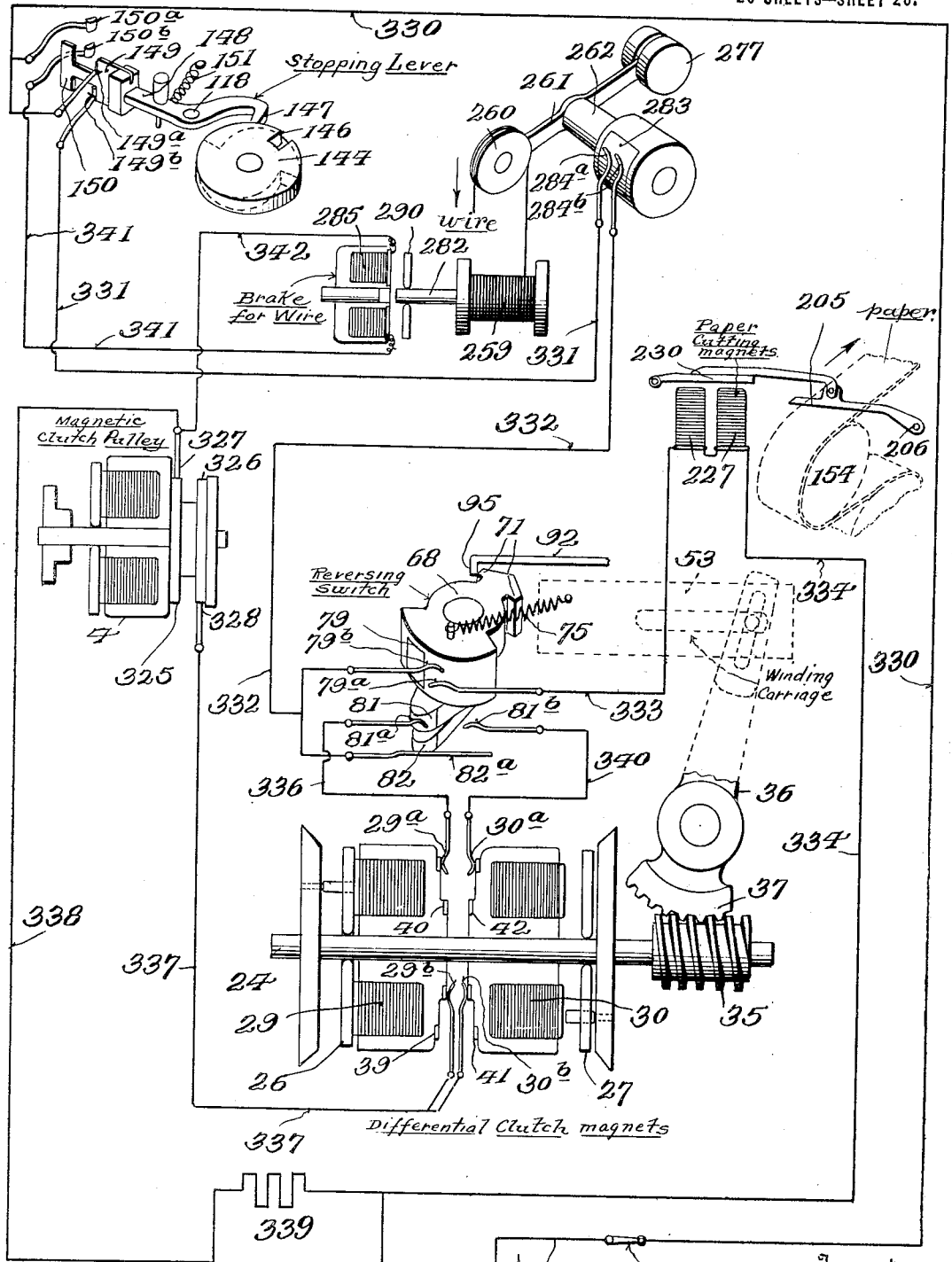

UNITED STATES PATENT OFFICE.

WILLIAM GRUNOW, OF NEW YORK, N. Y., ASSIGNOR TO SPLITDORF ELECTRICAL COMPANY, OF NEWARK, NEW JERSEY, A CORPORATION OF NEW JERSEY.

WINDING-MACHINE.

1,371,367.	Specification of Letters Patent.	Patented Mar. 15, 1921.

Application filed February 23, 1918. Serial No. 218,881.

*To all whom it may concern:*

Be it known that I, WILLIAM GRUNOW, a citizen of the United States, residing at New York, in the county of New York, State of New York, have invented certain new and useful Improvements in Winding-Machines, of which the following is a description, reference being had to the accompanying drawing and to the figures of reference marked thereon.

The invention relates to new and useful improvements in winding machines and more particularly to a winding machine for forming a wire coil used for electrical purposes.

An object of the invention is to provide a machine of the above character wherein the wire may be positively directed so as to form layers on a supporting core or member and wherein strips of insulating paper of proper length are cut and placed between the layers of wire.

A further object of the invention is to provide a machine of the above character with means for varying the length of the layers, so as to shape the coil.

A still further object of the invention is to provide a machine of the above character wherein the wire is directed by guiding devices carried by a reciprocating member and wherein the movements of the member are controlled by electro-magnetic clutches and a reversing switch which operates to connect first one clutch and then the other.

A still further object of the invention is to provide a reversing switch of the above character, which is spring actuated and which is tripped by a tripping device and associated stops, the distance between which may be varied for varying the time of reversal of the switch to shape the coil.

A still further object of the invention is to provide a machine of the above character wherein the reversing of the movements of the wire guiding member is electrically controlled through a reversing switch and a paper severing mechanism is also electrically controlled by the same switch and operated to sever the paper strip to permit the same to be moved forward.

Another object of the invention is to provide a coil winding machine of the above character wherein the machine is stopped by electrical means after a predetermined number of layers have been wound and wherein a brake is applied to the wire supply spool for preventing over running of the spool when the machine is stopped.

These and other objects will in part be obvious and will in part be hereinafter more fully described.

Referring to the drawings which show by way of illustration one embodiment of the invention:—

Fig. 4 is an enlarged fragmentary sectional plan view of the winding slide and layer counting mechanisms;

Fig. 5 is a detailed sectional elevation of the winding slide mechanisms;

Fig. 6 is an enlarged transverse sectional elevation view of the winding slide and controlling mechanism therefor;

Fig. 7 is a perspective view looking from underneath of the winding slide and parts carried thereby;

Fig. 8 is an enlarged detailed sectional elevation through the reversing switch mechanism;

Fig. 9 is a vertical sectional view on line 9—9 of Fig. 8 through the layer counting head and pyramiding cams;

Fig. 10 is a similar view to Fig. 9 taken at right angles thereto;

Fig. 11 is a horizontal sectional elevation on the line 11—11 of Fig. 10 showing the feeding means for counting the layers;

Fig. 12 is an enlarged horizontal sectional view through the differential clutch magnets for controlling the reciprocation of the winding slide;

Fig. 13 is a transverse sectional view on the line 13—13 of Fig. 12;

Fig. 14 is a similar view on the line 14—14 of Fig. 12;

Figs. 15 and 16 are detailed perspective views of the contact brushes for the respective differential clutch magnets;

Fig. 17 is an enlarged plan view of the electromagnetic clutch through which power is transmitted to the machine;

Fig. 18 is a sectional view through the electromagnetic clutch shown in Fig. 17;

Fig. 20 is a similar view illustrating the position of the reversing switch which is shown locked in the position for energizing the other of the electro clutch magnets when the winding slide is being reciprocated in the opposite direction;

Fig. 21 is a fragmentary view of the pyramiding cams and the locking lever for the reversing switch, the said locking lever being shown in the position of releasing or unlocking the reversing switch;

Fig. 22 is a similar view showing an associated notched disk into which one end of a switch lever falls when the winding of the coil has been completed, the opposite end of the switch lever serving to open the circuit of the machine and close another circuit for stopping the feeding of the wire from the spool;

Fig. 23 is a detailed elevation of the reversing switch and associated contacts;

Fig. 24 is a horizontal sectional view on the line 24—24 of Fig. 23 through the reversing switch and associated contacts;

Fig. 25 is a similar view on the line 25—25 of Fig. 23;

Fig. 26 is a vertical sectional view through the reversing switch;

Fig. 27 is a detached perspective view of several parts of the reversing switch;

Fig. 28 is a perspective view of the insulating or paper feeding mechanism;

Figs. 29, 30 and 31 are detailed views of the spring pressed locking pawls of the paper feeding mechanism;

Fig. 32 is a detailed elevation of the paper feeding mechanism and associated levers, the position shown being that when the machine is started;

Fig. 33 is a similar view showing the position of one of the pawls beginning the paper feeding operation;

Fig. 36 is an enlarged plan view of the paper feeding drum and the electromagnetically controlled cutting knife for said paper;

Fig. 37 is a vertical sectional view through the paper feeding mechanism, showing the electromagnetically controlled knife ready to cut a length of insulation or paper;

Fig. 38 is a detailed perspective view of the wire guiding finger;

Fig. 39 is a vertical transverse sectional view on the line 39—39 of Fig. 37 through the paper feeding and cutting mechanism, the knife being shown ready to sever the paper;

Fig. 40 is a similar detailed view showing the electromagnetically controlled cutting knife having severed the paper;

Fig. 41 is a detailed plan view of the armature to which the cutting knife is connected;

Fig. 42 is an elevation of one form of bracket for supporting the electromagnets for relative movement with the cutting knife;

Fig. 43 is an enlarged perspective view of the wire feeding mechanism and electrical brake control therefor;

Fig. 44 is a vertical sectional view therethrough;

Fig. 45 is a detailed end elevation of one of the supporting centers for the wire spool;

Figs. 46, 47, 48 and 49 are perspective views of a magneto coil, illustrating the winding of the wire and insertions of the insulating material between the wound layers of wire;

Fig. 50 is an enlarged sectional view through the secondary winding of a magneto coil, illustrating the successive shortening or pyramiding of the layers of wire as the coil is wound;

Fig. 51 is an elevation of a finished or wound magneto coil upon which the secondary winding has been applied;

Fig. 52 is a diagrammatic illustration of the successive alternate layers of insulating material, showing the manner in which the lapping of the ends of each layer circumferentially move around the coil;

Fig. 53 is an enlarged view showing the manner in which the paper insulation is fed into the path of the wire which is being wound; and Fig. 54 is a diagrammatic illustration of the several mechanisms of the machine and the electric circuits and controls therefor.

Figure 1:
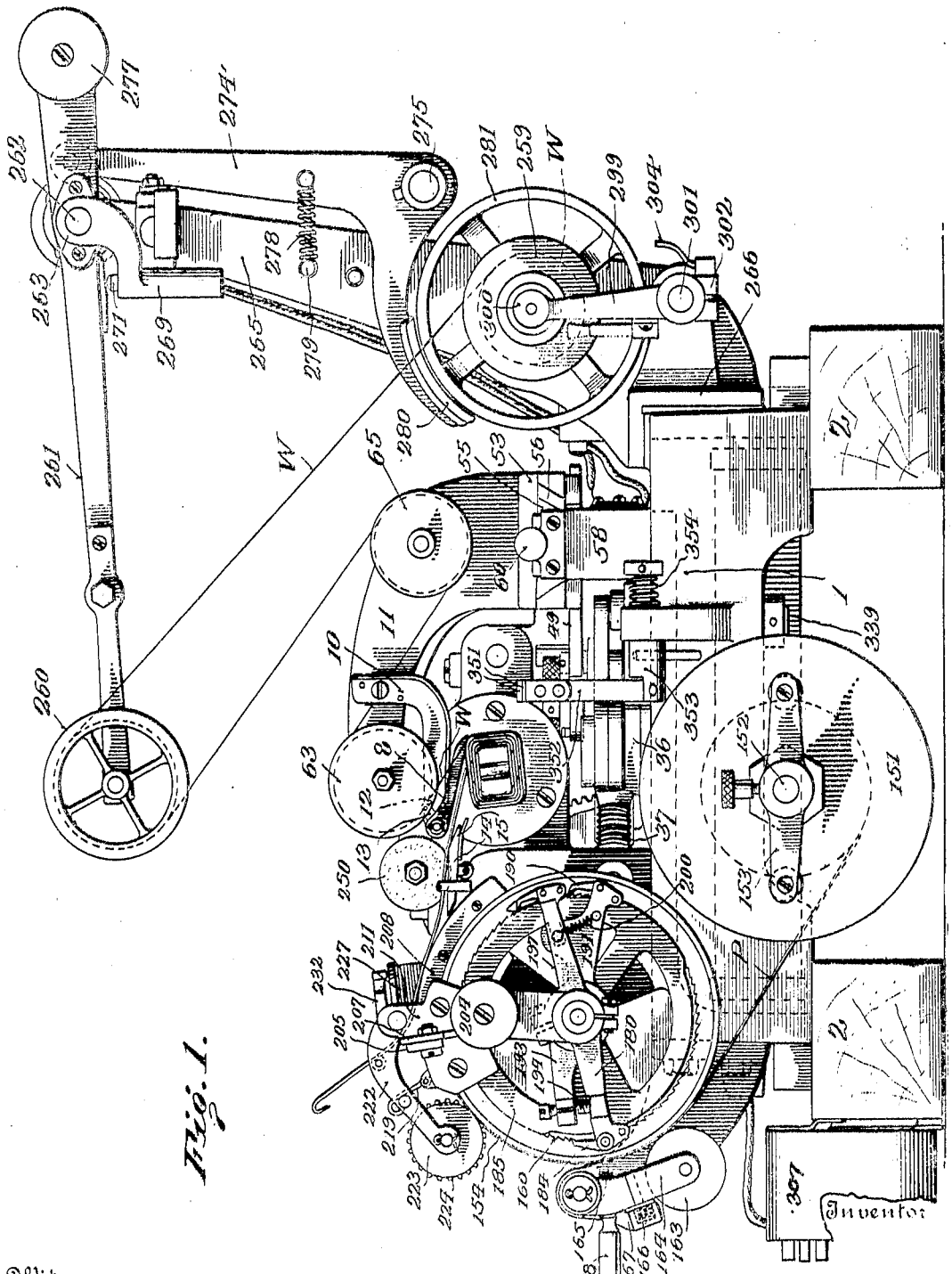
Figure 1 is a side elevation of my improved winding machine.

Referring to Figs. 46 to 49 inclusive, the present invention has been designed primarily for use in applying the secondary winding A to an electric coil, after the primary coil B has been wound upon the core C in the usual manner. The secondary winding is begun upon suitable insulation interposed between the primary and secondary windings, and consists of a continuously wound wire of fine gage, affixed to the coil between layers of insulating material. The insulation between the wire windings may be of any suitable material, but as contemplated herein, consists of treated insulating paper P which is fed from a reel and cut into suitable lengths adapted to surround the successive windings and overlap slightly, as shown. The product and method of winding same is illustrated in Figs. 46 to 49 inclusive of the drawings, wherein various positions of the wire winding and paper insulation operations are shown.

The paper feeding mechanism is designed to begin feeding the insulating paper near the end of the winding stroke or path of travel of the winding member, and, at the moment of the reversal thereof, the paper is cut and subsequently caught under the wire W and gradually covered by the wire as shown in Figs. 48 and 49, until the full layer of wire is applied, whereupon the winding member is again reversed and the foregoing operations repeated. As the winding continues the layers of wire are gradually shortened in length as shown in Figs. 50 and 51, thereby producing a pyramid formation of the windings. The means for accomplishing this will be referred to hereinafter as the pyramiding mechanism.

The width of the insulating paper preferably remains unchanged, but the lengths vary successively, being cut longer as the coil increases in diameter. The insulating papers or wrappings overlap and the overlapping position of the ends shift around the coil as shown diagrammatically in Fig. 52.

The machine may be set for applying any number of layers, dependent upon the desired intensity of the secondary winding and upon completing the last layer will automatically stop.

*General statement of construction.*

Generally stated, the machine comprises among other things the following mechanisms:—

A work supporting spindle for revolving the coil; a reciprocating member carrying the wire winding or guiding device for closely applying the wire to the coil; means including a shaft and associated connections for controlling the reciprocation of the wire guiding device; alternately energized electro clutch magnets for effecting the operation of the foregoing shaft; a reversing switch and associated contacts controlled by the operation of the winding guide for alternately energizing the clutch magnets; a pyramiding mechanism for successively shortening the lengths of the layers of wire; a counting mechanism for determining the number of layers of wire and insulation to be applied; an insulation or paper feeding mechanism including means for successively cutting the insulating paper into the proper lengths; a wire feeding mechanism comprising a freely mounted wire containing spool and means for controlling the unwinding thereof; an electromagnetic pulley through which power is transmitted to the machine; and a plurality of electrical circuits and associated controls for effecting the operations of the foregoing mechanism.

Figure 2:
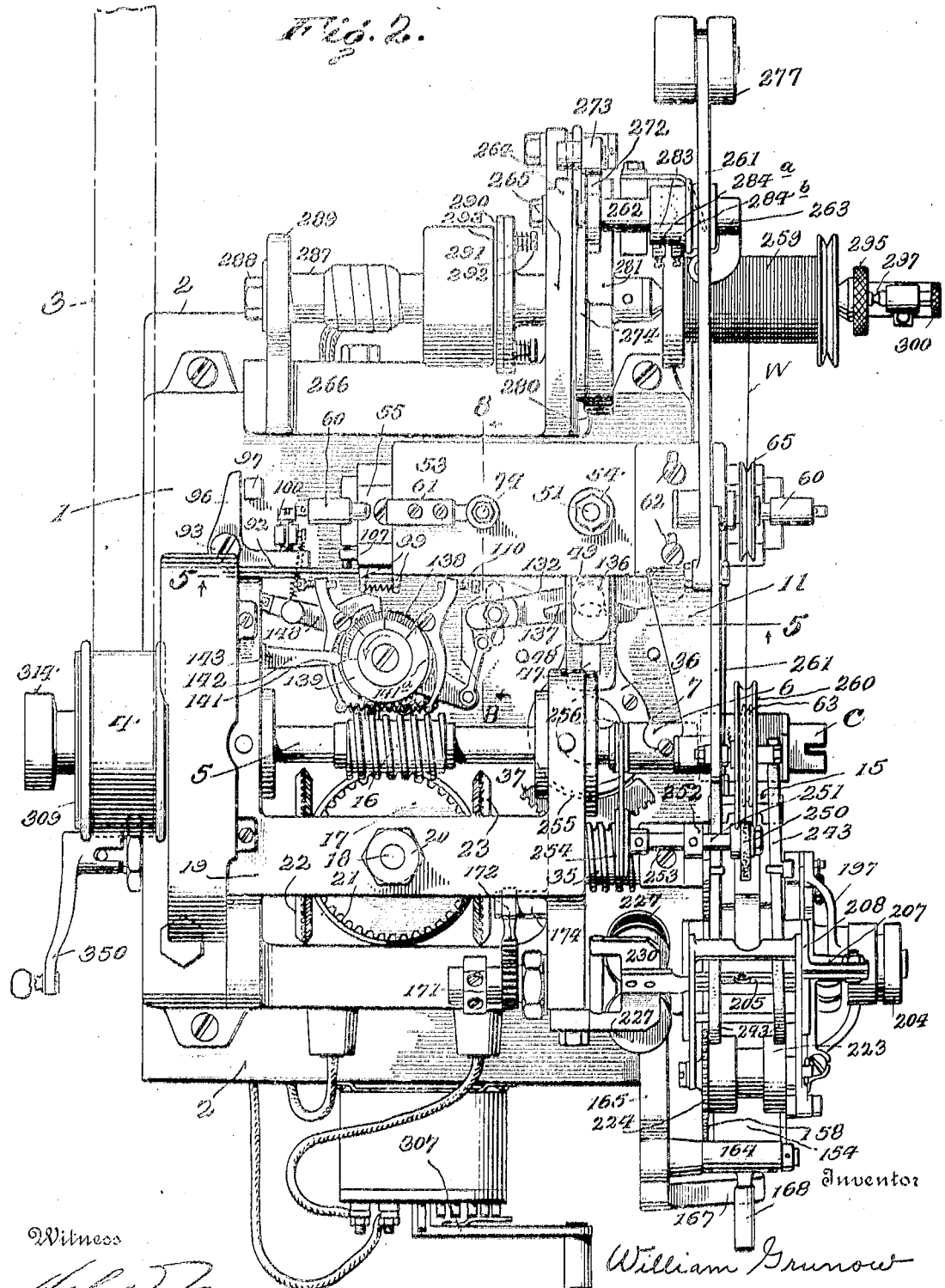
Fig. 2 is a top plan view thereof.
Figure 3:
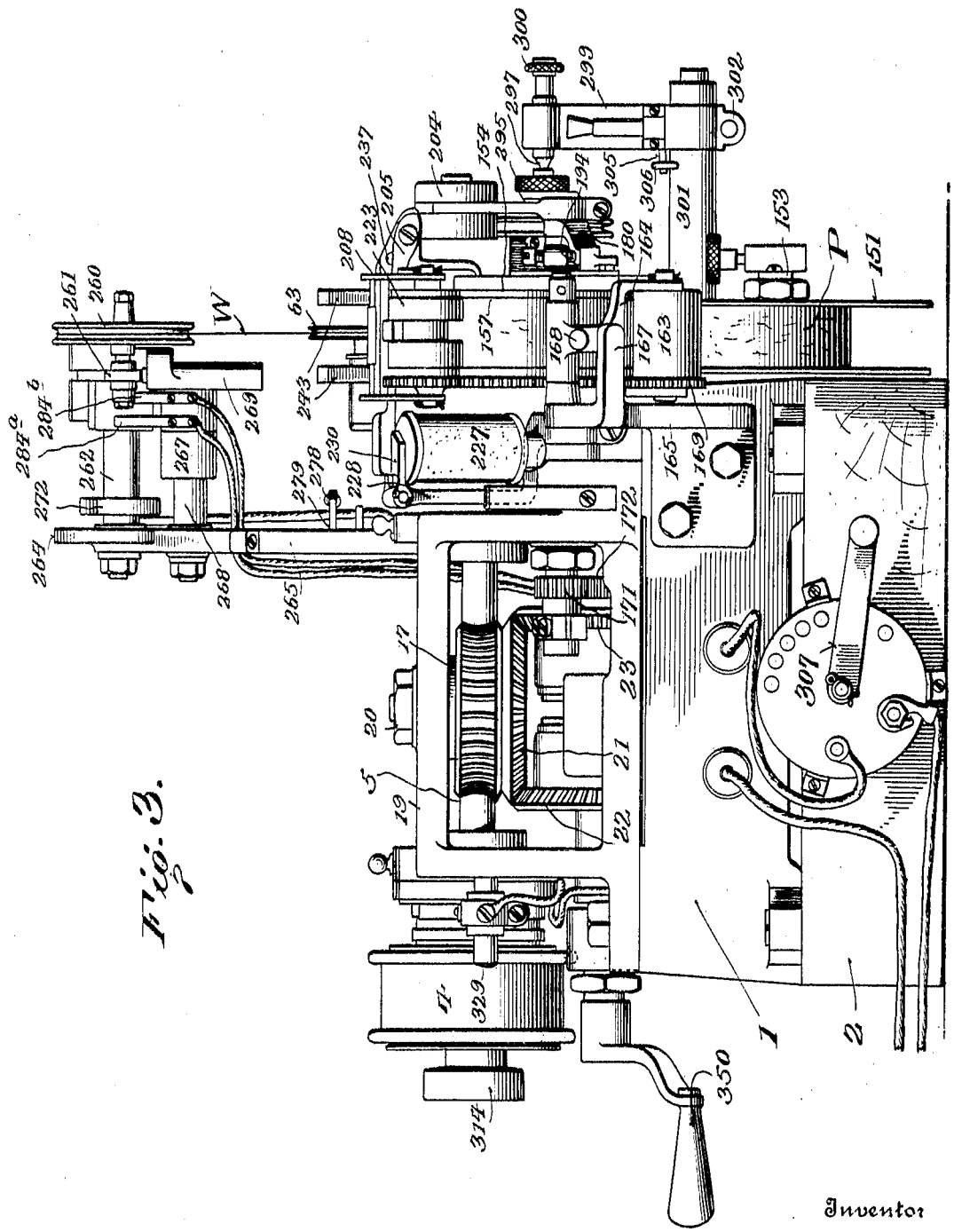
Fig. 3 is a front elevation.

Referring to the drawings and more particularly to Figs. 1, 2 and 3, the machine comprises a bed 1, suitably secured to supports 2, which latter may be in the form of spaced bars as shown or any other form of bench or table support. Power is transmitted to the machine by means of a belt 3, shown in dotted lines in Fig. 2, and adapted to encircle the pulley 4, which is connected to the main shaft 5 of the machine by an electromagnetic clutch control to be hereinafter described. When this electromagnetic clutch is energized the main shaft 5 is rotated and the machine begins the winding operation.

The work supporting spindle 6, is carried at the inner end of the main shaft 5, and comprises any suitable means such as gripping jaws or the like between which, the bifurcated end of the coil core is clamped by means of the screw 7. (See Figs. 2 and 36.)

Coöperatively associated with the core supported spindle 6 is a wire guiding finger 8, adapted to rest upon the coil and deliver the wire so that adjacent turns will be close together. This guiding finger has spaced side members 9 as shown in Figs. 37 and 38, which serve to arrest any knots or kinks in the wire. This wire guiding finger is gravitatingly pivoted upon a bracket 10 secured to an overhanging arm 11 of the winding slide mechanism to be hereinafter described. A stop pin 12 projects from the bracket 10 and serves to prevent the wire guiding finger from swinging downwardly too far when there is no core in place on the spindle 6. This pin 12 coöperates with an arm 13 extending from the sleeve 14ª to which the wire guiding finger is attached.

The paper for insulating the layers of wire passes through a guiding chute 14, the delivering end 15 of which is in close proximity to the wire guiding finger 8, and also close to the point of meeting of the wire and coil.

*Winding feed mechanism.*

Referring to Figs. 2 to 7 inclusive, the winding mechanism comprises a reciprocatory slide or carriage carrying the wire guiding finger 8. This slide or carriage is moved back and forth by a train of mechanism, including magnetic clutches. Power is transmitted from the main shaft 5 to these magnetic clutches through the worm shaft 16 adapted to mesh with a worm gear 17 secured to a vertically disposed stud shaft 18, the upper end of which latter passes through the cross bar 19 of the frame work of the machine and is secured in place by means of a nut 20. To the under side of the worm gear 17 is secured a master beveled gear 21 arranged to mesh with beveled gears 22 and 23 loosely mounted upon a clutch shaft 24 positioned in suitable ball and thrust bearings 25 provided on machine.

Referring to Figs. 12 to 16 inclusive, the beveled gears 22 and 23 have coöperatively associated with them armature disks 26 and 27 respectively, slidably mounted upon the clutch shaft 24, and pinned to the respective beveled gears by means of the projecting studs 28. Electromagnets 29 and 30 are positioned in suitable casings 31 and 32 secured to the clutch shaft by means of screws 33 and 34. By this construction it will be seen that upon the energizing of either of the electromagnets 29 or 30, their respective armatures 26 or 27 will be drawn into engagement therewith and by reason of the pin connection with the respective beveled gears effect a positive rotation of the clutch shaft 24 either one way or the other, depending upon which clutch is connected to the shaft. The clutch shaft 24 carries a worm 35 which meshes with a segmental gear 37, connected to the lever 36 of the winding slide operating mechanism.

The electromagnets 29 and 30 are supplied with an electric current, and are adapted to be alternately energized through the series of contacts associated therewith, and a reversing switch to be hereinafter described. The contacts associated with the respective armatures are positioned upon suitable insulating blocks 38 secured to the bed of the machine. These contacts are in the form of inwardly extending brushes against which suitable rings carried by the respective magnets revolve. (See Fig. 12.) The brushes 29ª and 29ᵇ of the magnet 29 are arranged to be wiped by the rings 39 and 40 respectively of the electromagnet 31. The brushes 30ª and 30ᵇ are adapted to be wiped by the rings 41 and 42 respectively of the electromagnet 30. Suitable electrical conductors are connected with these respective brushes and will be described hereinafter in connection with the other electrical circuits shown in Fig. 54.

The winding slide is reciprocated through the oscillation of the lever 36 upon the pivot stud 43 extending upwardly from the bed of the machine. Referring to Figs. 4 and 6 the lever 36 comprises an upper slotted arm 44 and a lower cam arm 45 secured to the segmental gear portion 37 of the lever 36 by means of screws 46. The upper arm 44 of the lever 36 is slotted as at 47 and is adapted to receive a sliding block 48 connected to an arm 49, which in turn is fixedly connected to the winding slide or carriage. The block 48 receives a pivot stud 50 extending from one end of the arm 49. By this construction it will be seen that as the lever 36 is oscillated, lateral reciprocatory motion will be imparted to the winding slide.

The bar 49 is connected to the winding slide or carriage by means of a vertically disposed bolt 51 arranged to pass upwardly through a slotted portion 52 in said arm. Said bolt is secured at its upper end to the body portion of the slide carriage 53 by means of a nut 54. The body portion of the winding slide 53 is designed to reciprocate upon a dove tail guide member 55 provided with a gib 56. The under side of the body portion 53 of the winding slide is also provided with depending lugs or guides 57 between which the bar 49 is placed. Said bar may be adjusted endwise by loosening the bolt 51 and thus the movement of the slide 53 may be varied for wires of different diameters.

The guide member 55 is suitably supported upon standards 58 secured to the bed of the machine, and is provided with a longitudinally arranged slot 59 which permits of the reciprocation of the winding carriage. Suitable spring accelerating bumpers 60 are secured to the guide member 55 and serve to accelerate the get-away-movement of the winding slide at each reversal thereof. An adjustable block 61 is provided on one end of the reciprocating carriage 53 and is designed to coöperate with one of the accelerating bumpers 60.

Adjustably mounted upon the winding slide 53 by means of the bolt and slot connections 62 is the overhanging arm 11 hereinbefore referred to. This overhanging arm carries the bracket 10 to which the wire guiding finger 8 is pivotally secured. Mounted upon the forward end of the overhanging arm 11 is a grooved pulley 63 over which the wire passes as it is led to the coil. This pulley is loosely mounted on a ball bearing 64 and serves to freely direct the wire through the guiding finger 8. Another grooved pulley 65 is similarly mounted on a bearing 66 extending from the overhanging arm 11, and serves to direct the wire from a pulley of the wire feeding mechanism to be hereinafter described.

From the foregoing construction of the winding slide and operating mechanism therefor, it will be seen that the alternate engagement of the electromagnetic clutches will oscillate the lever 36 and thereby impart reciprocatory motion to the winding slide 53 and wire guiding finger 8 for applying the successive layers of wire to the coil. The alternate engagement of the electromagnetic clutches is accomplished by a reversing switch adapted to be operated by mechanism carried on the winding slide. This reversing switch mechanism will now be described.

*Reversing switch.*

The reversing switch is located beneath the winding slide and comprises among other things, a movable switch member designed to make and break an electrical circuit through a plurality of contacts; a locking means including a lever for retaining said switch against movement during the reciprocation of the winding slide; and oppositely disposed tripping levers carried by the winding slide for alternately engaging the locking lever and thereby releasing the reversing switch, at which time a spring connection between the winding slide and the reversing switch serves to throw the latter and cause the reversal of the direction of travel of the winding slide.

Referring to Figs. 5, 7, 8, 19, 20 and 23 to 27 inclusive, the reversing switch includes a movable body portion 68 of insulating material which is pivotally mounted on a stud 69 secured to and extending upwardly from the bed of the machine. The movable body portion 68 has an extension 70 provided with oppositely arranged locking lugs 71. Mounted on the body portion 68 is a plate 72 of insulating material having an upwardly projecting pin 73. A spring 75 is connected at one end to the pin 73 and at its other end to the pin 74 on the slide 53. This spring 75 is placed under tension when the winding slide is reciprocated and upon the release of the locking means, to be presently described, the movable parts of the reversing switch are actuated and the direction of travel of the winding slide reversed.

The movable body portion 68 of the switch includes a sleeve 76 of insulating material to which the extensions 70 and the plate 72 are secured. The sleeve 76 is mounted upon the metallic member 77, which latter encircles the supporting stud 69 as clearly shown in Fig. 26. A screw 78 is threaded into the upper portion of the stud 69 and serves to hold the sleeve 77 in place. This forms a durable supporting means for the movable parts of the switch. The movable body portion 68 of the switch is provided with a series of metal contact surfaces adapted to bridge a plurality of brushes electrically connected with the electromagnetic controlling the cutting knife of the paper feed mechanism, and the clutch magnets respectively. One of the contact surfaces is indicted at 79. Said surface is adapted to coöperate with brushes 79ª and 79ᵇ in circuit with the electromagnet for operating the cutting knife of the paper feeding mechanism to be hereinafter described. The brush surface 79 of the reversing switch is designed to close the circuit through these respective contacts 79ª and 79ᵇ at the time when the reversing switch is released and operated by the spring 75 as hereinbefore described. This making and breaking of the circuit momentarily during the movement of the reversing switch, energizes the electromagnets which control the cutting knife of the paper feeding mechanism. The cutting knife circuit remains open during the winding operation, by reason of the contacts 79ª and 79ᵇ resting on the insulated portions 80 of the sleeve 76 of the switch.

The metal contact surfaces 81 and 82 respectively are designed to control the circuits for alternately energizing the electromagnets of the clutches 30 and 31. As shown, the brushes 81ª and 81ᵇ are adapted to be successively engaged by the metal surface 81 when the switch is reversing. The metal surface 82 is designed to continuously bear upon the brush 82ª through which electric current is fed into the circuit. The metal surfaces 81 and 82 are carried upon a split collar 83 adapted to frictionally encircle the reduced portion 84 of the sleeve 76. This collar 83 is frictionally held from movement on the sleeve 76 by means of a spring pressed plunger 85 as shown in Figs. 24 and 26. Stops 86 are positioned upon either side of the projecting portion of the split collar and serve to limit the movement thereof, with relation to the body portion of the reversing switch which is given a greater movement between stop pins 87 extending from the bed of the machine. (See Figs. 5, 19 and 24.) Insulating blocks 88 are also secured to the bed of the machine and serve to support the aforesaid brushes.

By this construction of reversing switch it will be seen that upon its being released at the end of each winding stroke, the contact surface 79 will sweep between the brushes 79ª and 79ᵇ thereby momentarily energizing the cutting knife magnet of the paper feed mechanism, and at the same time open the circuit to one of the clutch magnets and close the circuit leading to the other clutch magnet. Upon each reversal of the switch, the respective circuits of the two clutch magnets are therefore alternately opened and closed for controlling the reciprocatory motion of the winding slide.

A spring pressed plunger 89 is slidably mounted in a block 90 secured to the bed of the machine, and is positioned in the path of travel of the nose 91 of the extending plate 72 of the reversing switch. It will be seen that as the reversing switch is operated the nose 91 will wipe against the end of the spring pressed plunger 89 thereby momentarily retarding same for insuring the positive closing of the circuit through the metal surface 79 and its associated brushes leading to the electromagnet controlling the cutting knife. (See Figs. 19 and 20.)

The locking means for holding the reversing switch against movement during the reciprocation of the winding slide or carriage, includes a lever 92 pivotally mounted upon the stud 93 extending from the bed of the machine. The locking lever 92 is provided with a substantially long arm 94 having an angular extension 95 designed to alternately engage the locking lugs 71 above referred to. (See Figs. 19 and 20.) The shorter arm 96 of the locking lever extends outwardly and a spring 98 is interposed between the end of said arm 96 and a stop 97, which spring normally tends to press the long arm 94 of the lever against an adjustable stop 100. Arranged in coöperative relation with the long arm of the locking lever are tripping levers 99 pivotally carried upon the under side of the winding slide 53 as shown in Figs. 4, 5, 7, 19 and 20.

The tripping levers 99 are pivotally mounted upon studs 101 depending from a plate 102 secured to the under side of the body portion 53 of the winding slide by means of screws 103. Suitable collars 104 are pinned to the studs 101 beneath the tripping levers 99 for holding them in place. (See Fig. 7.)

Each tripping lever 99 is formed with an outwardly projecting arm 105 and a right angularly disposed arm 106, through which latter passes an adjustable screw 107. The end of each adjustable screw 107 is adapted to coöperate with the inner flat side of the long arm 94 of the lever 92. Projecting upwardly from the outer ends of the arms 105 of the tripping levers are pins 108 between which is interposed a spring 109. This spring serves to normally keep each of the adjusting screws 107 in coöperative contact with the lever 92.

In operation these tripping levers 99 are arranged to strike oppositely disposed adjustable stops 110, thereby pressing one or the other of the screws 107 against the arm 94 of the lever 92 and moving the same to release the locking lugs 71 of the reversing switch from the angular extension 95 of the locking lever 92. (See Figs. 21 and 22.) The adjustable stops 110 are threaded in the arms 111 of pivoted levers 112 coöperatively associated with the pyramiding mechanism to be presently described.

Figure 19:
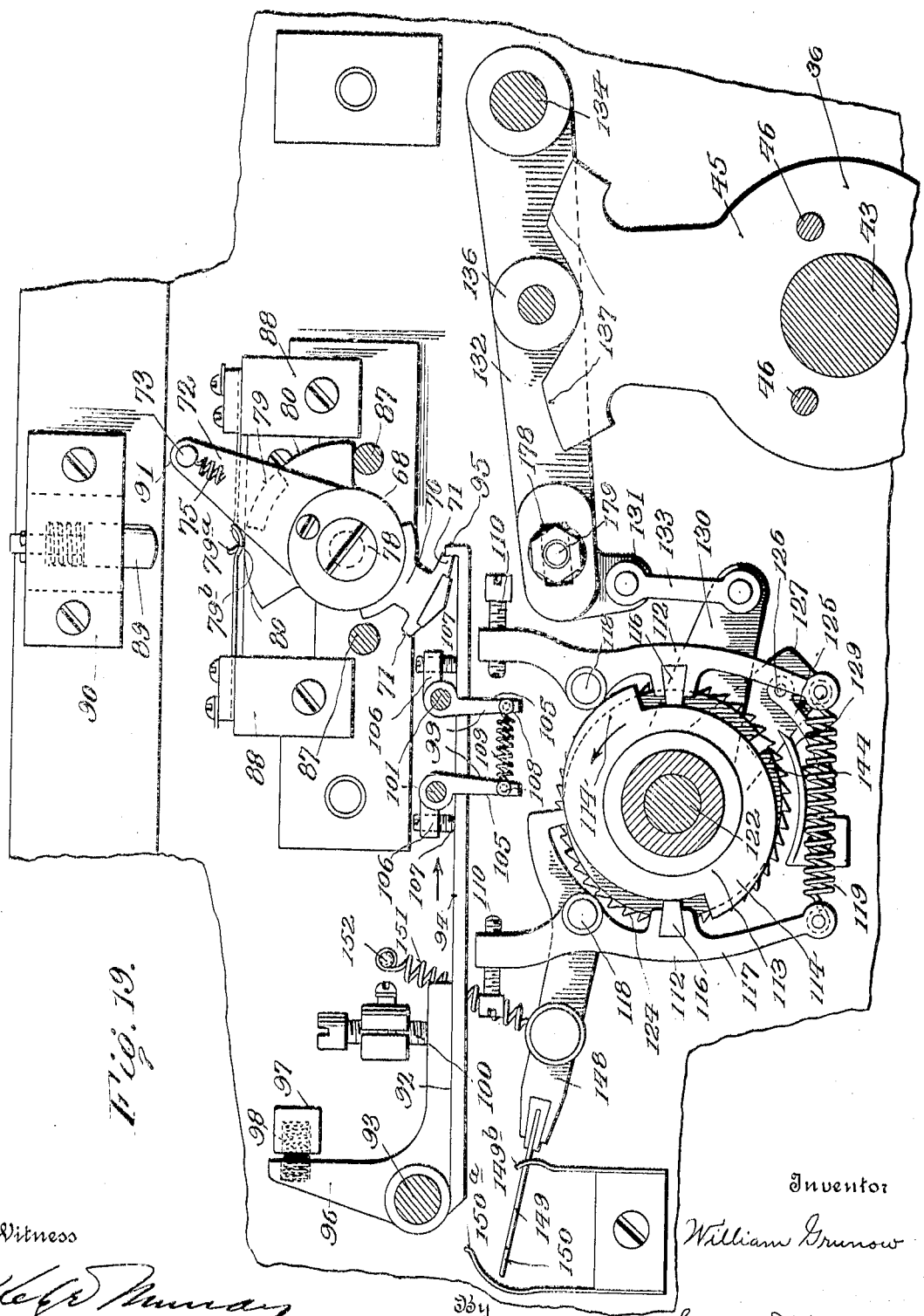
Fig. 19 is a fragmentary plan view of the layer shortening or pyramiding mechanism and the associated reversing switch for controlling the operation of the electro clutch magnets, the reversing switch being locked in a position where one of the electro clutch magnets is energized for reciprocating the winding slide in one direction.

As shown in Fig. 19 of the drawings the tripping levers 99 are moving with the winding slide in the direction of the arrow shown. As the winding slide reaches the end of its stroke or path of travel, one of the tripping pawls 99 will strike its adjustable stop 110 at the right, thereby causing the screw 107 to press the locking lever out of engagement with the locking lug 71 of the reversing switch, at which time the spring 75 interposed between the reversing switch and the winding slide reverses the switch to the position shown in Fig. 20. Upon the reversing of the direction of travel of the winding slide as indicated by the arrow in Fig. 20, the angular projection 95 of the locking lever will be pressed into locking engagement with the opposite locking lug 71 of the reversing switch, by agency of the spring 98 bearing upon the arm 96 of the locking lever. When the winding slide has reached its limit of travel in the direction shown by the arrow in Fig. 20 a similar operation occurs through the oppositely arranged tripping lever 99 striking its adjustable stop 110, shown at the left of the figure, thereby releasing the reversing switch and repeating the foregoing operations. By this construction it will be seen that during reciprocation of the winding slide the reversing switch is locked against movement, and is only operated to reverse the direction of travel of the winding slide when the latter reaches the limit of its reciprocatory path of travel.

The adjustable stops 110 are moved inwardly toward each other to shorten the stroke or path of travel of the winding slide and thereby reduce the width of the layer of wire forming the coil as shown in Fig. 50 of the drawings. The mechanism for shortening each successive layer of the wound wire will be now described as the pyramiding mechanism of the machine.

*Pyramiding mechanism.*

The pyramiding mechanism operates to shape the coil as shown at D in Figs. 50 and 51, by reducing the stroke or path of travel of the winding slide and thereby winding one or more turns less of wire in successive layers.

Referring to Figs. 8, 9, 10 and 19 to 22 inclusive, the pyramiding mechanism includes the cam disk 113 having diametrically opposed cam surfaces 114 terminating in diametrically opposed shoulders 115. Coöperating with these cam surfaces 114 are blocks 116 carried by the arms 117 of the pyramiding levers 112. These pyramiding levers 112 are pivotally mounted upon studs 118 extending from the bed of the machine. The stops 110 are carried by the levers 112 respectively. Between the ends of the arms 117 of the pyramiding levers a spring 119 is interposed. This spring holds the blocks 116 in contact with the respective cam surfaces 114 of the pyramiding cam.

The pyramiding cam 113 is secured to the body portion 120 of a sleeve 121, pivotally mounted on a stud 122 extending from the bed of the machine. Pins 123 serve to secure the pyramiding cam to the body portion 120. This cam 113 may be readily removed and another cam substituted therefor, for a different size wire. In other words, there is a different cam for each size wire.

The pyramiding cam is moved in the direction of the arrow shown thereon in Figs. 19 to 22 inclusive, by a counting step-by-step mechanism. During this movement, the eccentric cam surfaces 114 will press the arms 117 of the pyramiding levers outwardly, as shown in Figs. 21 and 22, thereby bringing the arms 111 of the said levers and the adjustable stops 110 carried thereby, toward each other for shortening the stroke or path of travel of the winding slide.

Counting mechanism.

Referring to Figs. 4, 8, 11 and 19 to 22 inclusive, the counting mechanism includes a toothed ratchet wheel 124 formed on the body portion 120 of the sleeve 121. Coöperatively associated with the ratchet-wheel 124 is a spring pressed pawl 125 pivoted at 126 upon an arm 127 radially extending from a hub section 128 loosely mounted upon the stud 122. A releasing shield 129 is secured to the bed of the machine and extends upwardly into the path of travel of the pawl 125 between the latter and the toothed ratchet-wheel 124 when said pawl is at the forward end of its movement, as shown in Fig. 11.

In operation this pawl 125 is designed to ride off the shield 129 into engagement with the ratchet-wheel 124 and advance the same a predetermined distance of one or more teeth as the case might be. (See dotted line position Fig. 11.) The pawl 125 is adapted to be oscillated back and forth, riding for the major portion of its stroke upon the shield 129. As the toothed ratchet-wheel 124 is successively advanced in the direction of the arrow shown thereon in Fig. 11 the pyramiding cam 113 is likewise successively advanced, effecting the shortening of the stroke or path of travel of the winding slide, as has been hereinbefore described.

The mechanism for oscillating the pawl 125 comprises an arm 130 formed integrally with the hub section 128 loosely mounted on the stud 122. The arm 130 is oscillated by a lever 132. Said lever is formed with a lug 131. A link 133 connects said lug 131 and the arm 130. (See Figs. 4, 19 and 22.) The lever 132 is pivotally mounted upon a stud 134 extending through a bearing 135 formed on the bed of the machine. (See Fig. 5.) A roller 136 is pivotally carried by the lever 132 and is adapted to coöperate with a double cam 137 formed on the lower cam arm 45 secured to the lever 36 hereinbefore described.

The lever 36 is rocked by the reversing of rotation of the worm 35 upon the clutch shaft 24. The double cam surface 137 will alternately ride upon the roller 136 thereby oscillating the controlling lever 132 for imparting motion to the pawl 125 for rotating the counting mechanism and pyramiding cam 113. The roller 136 is held against the double cam 137 by means of a spring 134' secured to an arm 135' on the stub shaft 134.

When a certain number of layers of wire have been formed in the coil, it is desired to stop the machine. This is accomplished automatically through the aid of a disk 144, which is secured to the body portion 120, by means of a screw 145. The disk 144 has a notch 146 adapted to receive the bent end 147 of a lever 148. This lever, when the bent end drops into said notch, operates to break the electric circuit holding the magnetic clutch closed, which connects the driving shaft to the operating belt wheel 4. The notched disk 144 moves with the ratchet wheel 124. The lever 148 is pivoted upon one of the stubs 118 and carries at its outer end, double contact surfaces 149 and 150 respectively. (See Fig. 54.) The contact surface 149 is designed to close the circuit between the contacts 149$^a$ and 149$^b$, which establishes the circuit through the magnetic clutch for controlling the operation of the machine, so that when this double contact lever engages these contacts 149$^a$ and 149$^b$, the machine will be operated for winding the coil. The contact surface 150 is designed to close the circuit through contacts 150$^a$ and 150$^b$ when the machine is stopped and these contacts 150$^a$ and 150$^b$ operate to energize an electromagnetic brake, which stops the movement of the spool or reel carrying the wire and prevents the same turning through momentum and thus unwinding wire therefrom after the machine is stopped. In beginning the winding operation, this counting mechanism or pattern controlling mechanism for determining the shape of the coil and the number of layers formed thereon is initially set. The pattern cam is turned by hand in a reverse direction and in order to determine the initial position or the starting position of the cam, I have provided a stop 141. This stop 141 is adapted to engage a stop finger 142, secured at 143 to the upper frame of the machine. The stop 141 is carried by an adjustable head 139 secured to the sleeve 121 by means of a screw 140. This adjustable head is also provided with suitable graduation 138. The lever 148 is released from the notch and the pattern cam may then be turned in a clockwise direction until the stop 141 engages the finger 142. If it is desired to produce a coil with a less number of layers, the screw 145 of notch disk 144 is loosened, the disk is then turned until its notch 146 coincides with a desired line on the graduation, whereupon this position of the notch disk is again secured by tightening its screw 145. The stop 141$^a$ prevents the operator from turning the pattern cam in the wrong direction when resetting.

Insulating paper-feeding mechanism.

The insulating paper P is fed from a suitable reel, cut into the proper length wrapper for surrounding a layer of wire, and then delivered to the rotating coil where it is caught under the wire, as shown in Figs. 46 to 49. The paper is cut and delivered to the coil at the time of the reversal of the winding slide.

Referring to Figs. 1, 2, 3 and 28 to 40 inclusive, the paper-feeding mechanism comprises a movable feeding drum over which the paper is fed from a supporting reel; means for successively varying the amount of movement of said feeding drum, a cutting knife electromagnetically controlled for cutting the paper into lengths; and means for delivering the cut paper over the delivering chute 14 heretofore mentioned.

The paper supporting reel 151 from which the insulating paper is fed, is rotatably mounted upon a stub shaft 152 extending from the bed 1 of the machine. This supporting reel 151 may be of any desired type having a friction retarding device 153 to prevent too rapid unwinding of the paper.

The paper is drawn from the reel 151 by the feeding drum 154. This feed drum is loosely mounted in the ball bearings 155 upon a stationary sleeve 156 secured in the upper frame work of the machine by means of the nut 156ª. (See Fig. 39.) The feeding drum comprises an outer surface having a recessed paper track 157, a gear wheel 158 secured to the side flange 159, and a ratchet wheel 160 secured to a web section 161 of the drum by means of screws 162.

Coöperatively associated with the paper track 159 of the feeding drum, is a spring pressed roller 163. This roller is rotatably mounted in an arm 164, pivoted to a bracket 165 secured to the bed of the machine. A spring 166 is interposed between a stationary arm 167 of the bracket 165 and the pivoted arm 164 for normally keeping the roller 163 in contact with the paper in the track 157 of the feeding drum. A handle 168 extends from the arm 164 and permits of the roller being lifted out of contact with the paper and away from the paper track 157 when the end of the paper is first inserted at the time of threading up the machine and at other times if found necessary.

A gear wheel 169 is also carried by the roller 163 and is adapted to mesh with the gear 158 secured to the inner flange 159 of the feeding drum.

The spring pressed roller 163 grips the paper strip on the drum 157 and as this spring pressed roller is positively driven by the drum, the paper strip will be positively advanced through the rolling gripping contact of this roller and the drum.

The means for moving the feeding drum and successively varying the amount of movement imparted thereto for feeding the successively lengthened paper wrappers, will now be described.

Referring to Figs. 6 and 28 to 37 inclusive, the mechanism for operating the feeding drum is supported upon a shaft 170 extending through the fixed sleeve 156. A gear 171 is pinned to one end of the said shaft 170 and is adapted to mesh with a segmental gear 172 formed on a lever 173 pivoted upon a stud 174 extending from the bed of the machine. One end of the segmental gear lever 173 is connected to one end of a link 175, the end of which is pivotally connected to an adjustable stud 176 designed to extend upwardly through an opening 177 in the bed of the machine, and connected to the controlling lever 132 hereinbefore described.

The stud 176 is adjustably mounted in the slotted end 178 of the controlling lever and is held in place by means of the nut and washer 179, Fig. 20. By this construction it will be seen that an adjustment of the movement of the segmental gear 172 and meshing gear 171 which controls the movement of the paper feeding drum can be readily obtained.

The means for rotating the feeding drum in the direction of the arrows shown in Figs. 28 and 32 to 35 when the gear 171 is rotated by the segmental gear includes an arm 180 pinned to the opposite end of the shaft 170. This arm 180 is provided with a spring-pressed pawl 183, one side of which is adapted to engage the ratchet wheel 160 secured to the feeding drum, while its other side 184 coöperates with a cam surface formed upon an annular ring 185 having a hub 186 which is free to revolve about the stationary sleeve 156. (See Figs. 28 and 39.) As this unit pawl 183 and 184 moves, one side 183 engages the ratchet 160 when its adjacent side 184 drops in the depression of cam 185.

The cam surface formed in the annular cam ring 185 comprises high portions 187 and an intermediate lower portion 188. The high portion of the cam is designed to elevate the unit pawl from the teeth of the ratchet 160, while the lower intermediate portion 188 of the cam permits the unit pawl to engage the teeth of the ratchet 160 for feeding the drum. The annular cam ring 185 is movable through a step-by-step motion in the direction of the arrow indicated thereon, which is opposite the direction of movement of the ratchet 160.

The annular cam ring 185 is also formed with a circumferential series of ratchet teeth 189 coöperatively associated with an actuating pawl 190 carried by an actuating lever 191 loosely mounted upon the hub 186 of the annular cam ring 185. The actuating lever 191 is provided with two arms 192 and 193, the former of which supports the actuating pawl 190, in engagement with the series of ratchet teeth 189 on the annular ring 185, and the latter of which is provided with an adjustable stopping screw 194 threaded into the end of said arm. The actuating lever 191 is also provided with an elongated notch 195 into which a stud 196 projects, carried by a relatively fixed arm 197. The fixed arm 197 is secured to the sleeve 156 by means of the clamp 198. Extending between the stud 196 on the fixed arm 197 and another stud 199 projecting from the actuating lever 191 is an actuating spring 200, the function of which will be presently described.

Carried by the fixed arm 197 are spring-pressed locking pawls 201 and 202 respectively. These pawls are adapted to cooperate with the circumferential teeth 189 on the annular cam ring 185, and the teeth of the ratchet 160 respectively for preventing any return movement of the annular cam ring 185 or ratchet 160, as will be understood.

Figure 35:
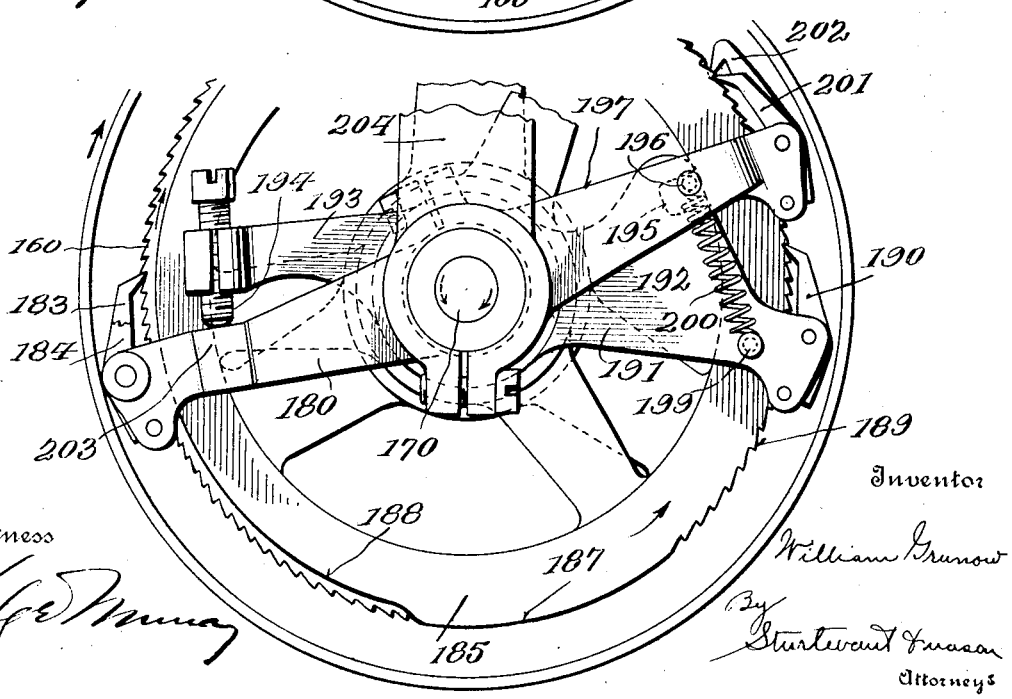
Fig. 35 is a similar view showing the said pawl at its limit of movement.

Referring to Figs. 32 and 35, four positions of the actuating mechanism of the feeding drum and the means for successively varying the movement thereof, are shown. Fig. 32 illustrates the position of the several elements when the machine is started; the controlling part 184 of the unit pawl is shown riding upon the high portion 187 of the annular cam ring, thereby disengaging its feeding member 183 from the teeth of the ratchet 160 secured to the paper-feeding drum.

Figure 34:
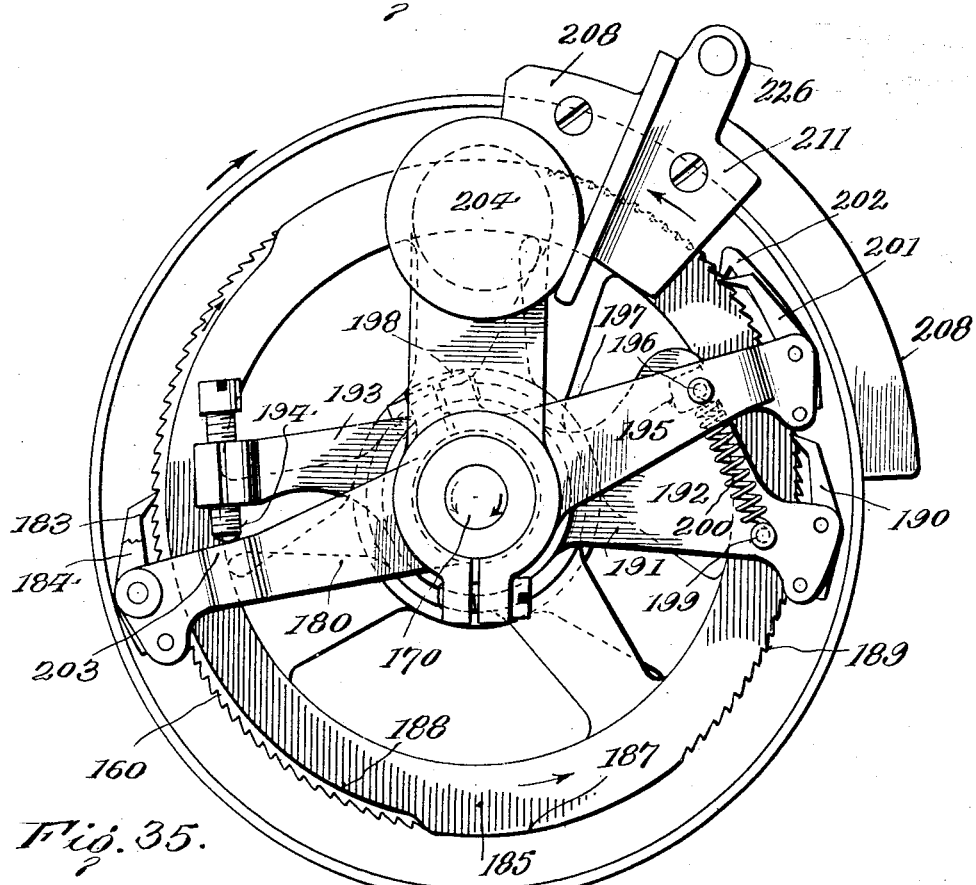
Fig. 34 is a similar view showing the position of said pawl as it nears the limit of its movement.

The unit pawl 183 and 184 is moved in the direction of the arrow shown on the arm 180 by the gear 171 meshing with the segmental gear 172, which latter is operated through the link connection 175. The high portion 187 of the annular cam ring 185 prevents the engagement of the actuating member 183 of the unit pawl until its other side 184 rides off the high portion 187 onto the lower portion 188, as shown in Fig. 33. When the pawl member 183 engages with the ratchet 160, the feeding drum and paper carried thereby will be moved in the direction of the outer arrow in Figs. 32 to 35, until an enlarged portion 203 of the arm 180 strikes against the adjustable stopping screw 194 carried in the arm 193 of the actuating lever 191, as shown in Fig. 34. A continued movement of the arm 180 will move the stopping screw 194, thereby shifting the actuating lever 191. As the actuating lever 191 is shifted, the actuating pawl 190 carried thereby is retracted over one or more teeth of the series 189 formed on the annular ring section 185.

Upon the reverse movement of the arm 180 and the unit pawl 183 and 184 carried thereby, the enlarged portion 203 of said lever moves away from the stopping screw 194 and the actuating spring 200 operates to move the actuating lever 191 in the reverse direction, until the lower edge of the elongated notch 195 is against the stop pin 196. During this operation, the actuating pawl 190 carried by the arm 192 of the lever 191 has moved the annular ring 185 one or more teeth in the direction of the arrow shown on said annular ring. The intermittent step-by-step movement of the annular ring serves to move the intermediate lower portion 188 of the annular cam ring 185 in a counter-clockwise direction. This causes the feeding operation of the pawl 183 to begin sooner and a longer length of paper is fed to the coil.

The return movement of the arm 180 and unit pawl 183 and 184 is aided by the weighted arm 204 clamped to the hub of arm 180 which is pinned to the shaft 170.

By the above construction the paper strip is positively fed forward to supply a length of insulating paper to be wrapped between the successive layers of wire on the coil and the length of paper fed forward is automatically and positively increased by certain predetermined increments so that as the coil increases in diameter, the length of paper strip necessary to encircle the coil at the point applied, will be furnished.

*Paper cutting mechanism.*

The paper cutting mechanism is associated with the feeding drum and comprises a yoke member 208 carrying an electrically controlled cutting knife. The yoke member is movable with the annular cam ring 185 about the stationary sleeve 156. The cutting knife is arranged transversely across the path of feed of the insulating paper and is adapted to cut a length of paper which serves as an insulating wrapper for each layer of wire wound upon the coil. The step by step movement of the yoke member secured to the annular cam ring 185 permits of the knife being moved intermittently in the direction of the arrow shown on the yoke in Fig. 28, for cutting the paper layer into increasing lengths.

Referring to Figs. 36, 37 and 39 to 42 inclusive, the paper cutting mechanism includes a knife 205 pivotally secured at 206 to an outwardly projecting arm 207 of the yoke member 208. The projecting arm 207 of the yoke may be formed integrally with one of the webs of the annular cam ring 185. The yoke member 208 is provided with flanged members 209 secured by screws 210 to the sides 211 of the projecting bracket 207 and to a radially projecting arm 212 freely mounted upon the stationary sleeve 156. (See Fig. 39.) A weighted arm 212ᵃ is secured to the radially projecting arm 212 and counter balances the paper cutting mechanism.

The yoke member 208 has secured thereto a ledger blade 213 adapted to coöperate with the cutting edge 214 of the knife 205. (See Fig. 37.) A spring 215 is also carried by the yoke member and is adapted to bear upon the under side of the paper for elevating the advancing edge thereof after the cutting operation.

A cross plate 216 is secured to the yoke member by a screw 217, and is provided with a guiding tongue 218 under which the paper is fed. (See Figs. 36 and 37.) Pivotally secured to the cross plate 216 is a spring latch 219, the upper end 220 of which is designed to engage a cross bar 221 interposed between the side arms 222 of a paper feeding roll 223.

The paper feeding roll 223 is designed to bear upon the paper, and by reason of the gear 224 carried thereby and meshing with the feeding drum gear 158, will positively assist the advancing of the paper to the coil. The arms 222 of the coöperating feeding roll 223 are formed integrally with a hub section 225, the ends of which are journaled in bearings 226 extending upwardly from one of the sides 211 hereinbefore referred to.

The operating mechanism for the cutting knife, includes an electromagnet 227 suitably supported on the bracket 228 clamped to the hub section 229 of the movable arm 212 supporting the yoke member hereinbefore referred to. Coöperating with the electromagnet is an armature 230 pivoted at 231 to the supporting bracket 238. An arm 232 is attached to the armature 230 of the magnet and is provided with a projecting end 233 to which the cutting knife 205 is pivotally secured at 234. The cutting knife has an extension formed with a slot 235 to receive the pivot 234 and this permits the parts to move freely.

Upon the energizing of the electromagnet 227 through an electric circuit to be hereinafter described, the armature 230 is drawn downwardly thereby causing the arm 232 carried thereby, to move the knife downwardly across the paper. The cutting position of the knife is shown in Fig. 40. In this position it will be seen that as the cutting edge 214 of the knife severs the paper, the spring 215 will be depressed. Upon the deënergizing of the electromagnet 227 the spring 215 will elevate the advance edge of the paper, and the spring 236 will elevate the arm 232 of the armature bringing the cutting knife against the stop 237 provided on the projecting arm 207.

The energizing of the electromagnet 227 occurs when the reversing switch hereinbefore described is oscillated. The circuit is momentarily closed when the contact surface 80 of the reversing switch passes over the brushes 79ª and 79ᵇ hereinbefore described.

In operation it will be seen that as the annular cam ring 185 of the drum mechanism is intermittently moved in the direction of the arrow shown thereon, the yoke 208 will be correspondingly moved, thereby moving the cutting knife and its associated operating means. This movement is predetermined for the automatic cutting of the paper insulating wrappers into successively longer lengths, for insuring the complete surrounding of each layer of wire as the diameter of the coil being wound increases.

*Paper guide.*

Referring to Figs. 28, 36 and 37:—

The paper supporting chute 14 hereinbefore referred to is designed to direct the paper from the feeding drum to the coil. The chute 14 is supported from the yoke 208 and is provided with side walls 238 the outer ends of which are bridged by a cross plate 239 between which and the bottom of the chute, the paper is guided. Extending from the under side of the delivery of the chute, are spaced spring fingers 240. These fingers are designed to bear upon the coil in directing the paper thereto. Secured to the cross plate 239 of the chute 14 are spaced spring strips 241 having forwardly projecting spring extensions 242 and rearwardly extending spring members 243 designed to pass beneath projecting pins 244 carried upon suitable uprights 245 secured to the chute 14. The spring extensions 243 of the spaced strips 241 are designed to pass beneath the hub section 225 and bear against the reduced ends 246 of a spacing bar 247 carried by the paper roller supporting arms 222. (See Figs. 28 and 37.) The purpose of these spaced arms 241 is to direct the paper from the feeding drum through the guiding channel 248 of the yoke 208 and on to and through the chute 14.

Curved guide lugs 249 are provided on the chute 14 and rest within the guiding channel 248. These curved portions 249 further insure the directing of the paper from the yoke to the chute 14. The yoke 208 is intermittently moved as has been heretofore described, but these curved portions 249 remain stationary with the chute 14. The spring extensions 243 of the spaced paper guiding strips 241 also remain stationary with the chute. The yoke parts slide back on the extension. Thus it is that the guiding means for the paper strip takes care of the varying distance between the cutting device and the coil.

The means for feeding the paper wrapper to the coil after it has been cut, comprises a roller 250 secured to a shaft 251 mounted in a bearing 252 secured at 253 to the bed of the machine. The shaft 251 is provided at its other end with a pulley 254 around which passes a belt 255 leading to another pulley 256 carried by the work-supporting spindle or main shaft 5. (See Fig. 2.)

The feeding roller 250 is of a soft material such as rubber or the like, adapted to frictionally grip the paper in conjunction with another roller 257, operating in an opening 258 in the chute 14. By this construction it will be seen that when a length of paper is cut by the knife 205, the released cut strip will be rapidly fed to the coil and gripped beneath the wire and wound into the coil, though held taut by reason of the roller 250 revolving slower than the work-supporting spindle or main shaft 5.

*Wire-feeding mechanism.*

Referring to Figs. 1, 43, 44 and 45, the wire-feeding mechanism includes a spool 259 from which the wire is conducted over the pulley 260 to the pulleys 65 and 63 respectively, carried by the winding slide hereinbefore described. The pulley 260 is mounted upon the end of a spring tension lever 261 secured to a shaft 262, pivotally mounted in bearings 263 and 264, respectively. The bearing 264 is formed in the upper end of a supporting arm 265 extending upwardly from a bracket 266 bolted to the bed of the machine. The bearing 263 is an extension provided upon a block 267 secured to a projecting bolt 268 fastened to the supporting bar 265. A downwardly projecting tubular portion 269 extends from the bearing 263 and has contained therein a spring 270 adapted to bear against a plunger 271. The purpose of this spring is to yieldingly tension the wire as it is fed over the pulley 260 to the coil.

The shaft 262 is provided with a cam 272 adapted to coöperate with a roller 273 pivotally mounted upon the upper end of a brake lever 274. Said lever is pivoted upon a stud 275 projecting from the supporting arm 265. The cam 272 is provided with a low portion 276 upon which the roller 273 rides should the wire break.

In operation it will be seen that should the wire break during the winding operation, the lever 261 will be swung upwardly by reason of the weighted end 277. This movement of the lever causes the cam surface 276 of the cam 272 to move into engagement with the roller 273. The spring 278 secured to the brake lever 274 and a pin 279 extending from the supporting arm 265, serves to keep the roller 273 in engagement with the cam 272. As the roller 273 rides on to the surface 276 of the cam, the brake lever 274 will be rocked upon the pivot stud 275 thereby causing the brake shoe 280 of the brake lever to frictionally engage the pulley 281 revolubly mounted upon a shaft 282 supporting the wire feeding spool 259. This braking operation will serve to stop the rotation of the wire spool 259 and prevent the over-running of the same.

An electrical controlling device for breaking the circuit of the machine is also associated with the wire feeding mechanism for braking the wire feeding spool 259 upon the breaking of the wire during the winding operation. This mechanism comprises a contact surface 283 carried by the shaft 262. Coöperating with this contact surface 283, are brushes 284$^a$ and 284$^b$ arranged in circuit with the electrical current supplied to the machine. In case the wire breaks, the lever 261 will swing upwardly as has been described, thereby rotating the shaft 262 and swinging the surface 283 away from the brushes 284$^a$ and 284$^b$, at which time the electrical circuit of the machine is broken and the machine stops.

In addition to the means for stopping the unwinding from the spool 259 should the wire break, an additional electrical control mechanism is provided which acts as a brake for stopping the rotation of the wire spool upon the completion of the winding of the coil. (See Figs. 43 and 44.) This mechanism includes an electromagnet 285 supported upon an extension 286 of an internally threaded rod 287. A bolt 288 serves to secure this supporting rod 287 in an arm 289 of a bracket 266 bolted to the bed of the machine. The electromagnet 285 has associated therewith an armature 290 normally held withdrawn from the electromagnets by means of springs 291 interposed between the heads of screws 292 and a disk 293 secured to the shaft 282 of the spool supporting mechanism.

When the electromagnet 285 is energized by the closing of an electrical circuit through the brushes 150$^a$ and 150$^b$ and the bridging contact surface 150 carried by the stopping lever 148 hereinbefore described, (see Fig. 54) the armature 290 will be attracted by the electromagnet 285, thereby serving as a frictional brake to prevent excess unwinding of the wire from the spool 259 after the machine stops. This electromagnetic brake just described is arranged in circuit with the current of the machine, and is energized when the full number of layers have been wound upon the coil, according to the setting of the counting mechanism.

The wire feeding spool 259 is of the usual construction, and is supported upon the shaft 282 by means of a conical shaped sleeve 294 and a nut 295 threaded upon the end of the shaft 282 and having a conical shaped member engaging the spool. The shaft 282 is revolubly mounted in a ball bearing 296 formed in the supporting standard 265. The outer end of the shaft is supported by a spring pressed pin 298 secured in a movable standard 299. The pin 298 has a cone shaped end 297.

A thumb nut 300 is threaded upon the reduced end of the bearing pin 298, which permits of the said conical bearing support 297 being retracted from the shaft 282, for removing an empty spool and inserting a new spool. The supporting standard 299 is movably supported upon the reduced end 303 of a rod 301 secured to and projecting from the bracket 266 bolted to the machine. A clamp 302 provided on the supporting standard 299 is designed to surround the reduced portion 303 of said rod and hold the said supporting standard and the conical bearing supporting pin 298 carried thereby, in fixed position. A lever 304 extends from the bolt of the clamp 302 and affords a ready means for tightening and loosening the clamp when removing and inserting a spool of wire.

Projecting from the supporting standard 299 is a pin 305 adapted to move between stop pins 306 to limit the movement of the said supporting standard, when it is unclamped, and swung into the position shown in dotted lines in Fig. 45 of the drawings for the introduction of a wire spool.

*Electromagnetic clutch pulley.*

Through the electromagnetic pulley of the machine, shown in Figs. 2, 3 and particularly the detailed Figs. 17 and 18, power is transmitted to the machine. When this magnetic clutch pulley is energized by the closing of a switch 307 mounted in the front of the machine, motion is imparted to the main driving shaft 5 through the pulley 4 from the belt 3, as hereinbefore described.

Referring to Figs. 17 and 18, the electromagnetic clutch pulley comprises an electromagnetic clutch mounted within the pulley 4 and a coöperating armature 309 keyed to the main driving shaft 5 as at 310. The armature 309 is slidably mounted on the reduced end 311 of the main driving shaft 5 and is provided upon its inner periphery with suitable clutch rings 312 arranged to engage the face 313 of the pulley 41 when the electro-magnetic clutch is energized. These clutch rings 312 are of the slipping type for gradually transmitting power to the main shaft 5 when the machine is started. This construction insures a gradual and even tension upon the wire as it is drawn from the wire feeding spool and started to be wound upon the coil, without danger of breaking. A hand wheel 314 is secured to the hub of the armature 309 and may be gripped for retarding the engagement of the clutch when the machine is started. A nut 315 is threaded upon the reduced end 311 of the main shaft 5 and limits the outward movement of the armature 309 when the electromagnetic coil of the clutch is deënergized. Interposed between the armature 309 and a shoulder 316 upon the main shaft is a spring 317 for retracting the armature when the electromagnetic coil is deënergized.

The pulley 4 in which is carried the electromagnetic coil 308, is loosely mounted upon a bearing sleeve 318 extending from a hub section 319 secured in the standard 320 formed integrally with the upper framework of the machine. The main shaft 5 extends through the sleeve 318 and has a suitable ball bearing 321 secured in the hub section 319, as shown in Fig. 18. The bearing 321 which may be of the ball type, is protected by a nut 322.

The pulley 4 is provided with a hub 323 around which is secured an insulating sleeve 324 of fiber or the like. Suitable commutation rings 325 and 326 are provided upon the insulating sleeve 324, and are designed to coöperate with contacting brushes 327 and 328 respectively. These contacting brushes are carried upon projecting studs 329 extending from the standard 320 of the upper framework of the machine. Leading from these respective contacting brushes are electrical conductors arranged in circuit with the current of the machine, as will presently be described in connection with the electrical layout shown in Fig. 54.

In operation it will be seen that upon the energizing of the electro-magnetic coil 308 the armature 309 carrying the clutch rings 312 will be drawn against the side 313 of the pulley 4 and motion will be transmitted through the said pulley 4 to the main shaft 5 for operating the machine.

*Diagram of electrical circuits and mechanism.*

In Fig. 54 of the drawing the electrical circuits and the controlling mechanisms of the machine hereinbefore described are diagrammatically set forth. These mechanisms which are electrically controlled include the clutch magnets for reversing the travel of the winding slide, the reversing switch operated by the winding slide for alternately energizing the clutch magnets, the cutting magnets for cutting the insulating wrappers for insertion between the layers of wire, the wire-feeding mechanism and the brake controls therefor, a lever associated with the counting mechanism for stopping the machine when the predetermined number of layers have been wound upon the coil, and the electromagnetic clutch pulley for controlling the operation of the machine.

Current is supplied to the machine through the electrical conductor or feeder 330, in which is interposed a starting switch 307. The electrical conductor 330 leads to the brushes 149$^a$ and 150$^a$ respectively, as shown. While the machine is operated during the winding of the coil, the current passes through the conductor 330 to the brush 149$^a$, thence through the bridging members 149 carried by the lever 148, to the brush 149$^b$, from where it continues through the conductor 331 to the brush 284ª of the wire tension mechanism. Through the contact surface 283 thereof, current continues through the brush 284ᵇ to the conductor 332 to the brush 79ᵇ and the brush 82ª respectively associated with the reversing switch as hereinbefore described. After the reciprocation of the winding slide, the circuit of the paper-cutting magnets through the brushes 79ª and 79ᵇ is broken, as shown in Fig. 54. This circuit is momentarily closed at the time of the reversal of the winding slide. The closing of the circuit through a conductor 333 leading to the paper-cutting magnets, and the ground conductor 334, as indicated at 335, causes the operation of the cutter.

The conductor 332 which carries the current to the brush 82ª of the reversing switch, is designed to supply current for the alternate energizing of the clutch electro-magnets 29 and 30, through the alternate engagement of the brushes 81ª and 81ᵇ by the contact surface 81. The contact surface 81 is electrically connected to the contact surface 82 by reason of the current conducting material of which the split collar 83 of the reversing switch is made.

As shown in Fig. 54 the current passes through the brush 82ª the contact surfaces 81 and 82 of the reversing switch to the brush 81ª; and from the brush 81ª through the conductor 336 to the brush 29ª bearing upon the ring 39 of the clutch magnet 29. The current continues through the ring 40 and brush 29ᵇ of the magnet 29 to the conductor 337 leading to the contact brush 328 and commutator ring 326 of the electromagnetic clutch pulley, through which it passes to the commutator ring 325 and contact brush 327 to the conductor 338, the latter being connected with the rheostat 339 through which it passes to the ground conductor 335.

The clutch magnet 29 is energized while the winding slide is traveling in one direction in applying one layer of wire to the coil. When the winding slide reaches its end of travel, the lever 92 of the reversing switch mechanism hereinbefore described, is released and the spring 75 which has been placed under tension and in which power is stored through the movement of the winding slide, operates the reversing switch de-energizing the clutch magnet 29; and momentarily energizing the cutting knife magnets through the brushes 79ª and 79ᵇ and energizing the clutch magnet 30 for reversing the travel of the winding slide. Upon the energizing of the clutch magnets 30 the current of the machine passes from the conductor 332 to the brush 82ª through the contact surfaces 82 and 81 to the brush 81ᵇ, and thence through the conductor 340 to the brush 30ª to the ring 41 of the differential clutch magnet 30. Current continues through this magnet 30 to the ring 42, thence through the brush 30ᵇ to the conductor 337 leading to the electromagnetic pulley clutch mechanism which remains constantly energized during the operation of the machine.

From the foregoing, it will be seen that upon each reciprocation of the winding slide 53, the reversing switch 68 is operated, thereby alternately energizing the clutch magnets 29 and 30 for producing the reciprocation of the winding slide by the worm 35 and segment 37 provided upon the lever 36 connected to the winding slide. It will also be apparent that a length of insulating paper is cut at the moment of reversal of the winding slide at each end of its stroke through the operation of the cutting knife 205.

During the operation of the machine, it will be obvious that should the wire break, the weighted lever 261 will be rocked upon the shaft 262 thereby breaking the circuit through the contact 283 and the coöperating brushes 284ª and 284ᵇ, the circuit for the current through the feeder 330 to the conductors 331 and 332 respectively, being broken.

When the final layer has been applied to the coil according to the predetermined number of layers desired, the bent end 147 of the stop lever 148 is dropped into the notch 146 of the disk 144 carried by the counting mechanism. The rocking of the lever 148 breaks the circuit between the brushes 149ª and 149ᵇ, through which current to the machine is supplied from the conducting feeder 330. The movement of the stop lever will also bring the contact surface 150 carried thereby, into operative engagement with the brushes 150ª and 150ᵇ, thereby closing the circuit through the current conducting feeder 330 and another conductor 341 leading to the electromagnet 285 of the brake for stopping the excess unwinding of the wire from the spool 259 after the machine has stopped. A conductor 342 completes the circuit through the electromagnet for braking the wire spool, and is connected to the conductor 338 as shown in Fig. 54.

From this construction and arrangement of the circuits, it will be seen that upon the completion of the winding operation of the machine as determined by the counting mechanism, the electric current for controlling the operation of the winding slide will be broken through the action of the switch or stopping lever 148 opening the circuit through the contacts 149ª and 149ᵇ respectively, and in addition effect the closing of another circuit through the contacts 150ª and 150ᵇ for energizing the electromagnets 285 which attract the armature 290 for preventing the excess unwinding of the wire from the spool.

When the prescribed number of alternate layers of wire and insulation have been applied to the coil and the machine stops, the coil is removed from the machine, and another one inserted for the affixing of the secondary winding thereto. While inserting another coil into the machine, the end of the wire is held between spring fingers 351 carried on an arm 352 extending from a movable bar 353. (See Fig. 1.) A spring 354 frictionally holds the bar 353 in its adjusted position. This device prevents the unthreading of the wire from around the pulleys as will be readily understood.

Operation of the machine.

The core C upon which has preferably been wound the primary winding B for an electric coil is placed in the machine with the bifurcated end of the core C inserted between the gripping jaws upon the work supporting spindle 6. When the main shaft rotates, it will turn this spindle 6, winding the wire in layers about the core or previously formed windings thereon. Either one or the other of the clutches controlling the movement of the winding slide is connected to the worm 16 of the shaft 5 and therefore, when the machine is started, the winding slide, that is the slide carrying the rollers for guiding the wire and the guiding finger through which the wire is directed to the core, will at once be moved, so as to properly place the wire in a layer with the successive turns closely laid. As the slide moves endwise, power is stored in the spring 75 which operates the reverse switch. The switch however, is held from movement by the locking lever 92. The tripping levers 99 move with the slide and when one of these tripping levers come into engagement with the stop associated therewith, said tripping lever will be swung so as to release the locking lever 92 and permit the spring 75 to quickly shift the reverse switch. Upon the shifting of the reverse switch, the other clutch wil be connected to the shaft 5 and the slide will then be moved in the opposite direction, again placing the turns of wire closely together, forming another layer of wire on the coil. The reversing switch energizes the magnet which controls the cutter and the strip of paper will be cut just at the moment the winding slide begins its reversing movement, for the reason that as soon as the paper is severed, the gripping feeding wheels feed the strip forward and the end thereof is caught underneath the wire and then the paper will be wound about the coil and positioned, so that the next layer will be placed on top of the layer of paper insulation. When the winding slide reaches the other end of its reciprocation, the reversing switch is again brought into operation, the control of the reversing slide this time being brought about by the other trip lever and the stop associated therewith. The lever 36 reciprocates the slide, which moves back and forth and directs the wire onto the coil and this lever in its movement through the cams 137 and the lever 132, causes the counting disk to be stepped around one tooth or a predetermined number of teeth for each movement of the slide. This counting disk performs two functions; first, it controls the stops associated with the trip levers so as to shorten successive layers and thereby cause the pyramiding effect in the coil; and second, said counting disk serves to stop the machine after a certain number of step movements are imparted thereto and therefore, counts the number of layers which are formed in the completing of a coil before the machine is stopped. When this counting disk reaches a predetermined position, the end of the stop lever drops into the notch forward in the counting disk and controls the current so as to de-energize the electric magnet connecting the driving pulley 4 to the main shaft 5 and this stops the machine. As above noted, this movement of the stop lever also, through a suitable electric magnet applies a brake to the spool containing the wire and prevents over-running of the same.

The arm carrying the guiding roll for the wire is under tension and if the wire should break the arm is moved to break the circuit which supplies current to the controlling magnet for the driving pulley 4 and this causes the machine to stop. The paper feeding drum is actuated by the lever 132 which receives its movements while the winding slide is between its points of reversing and therefore while a layer of wire is being formed, the drum is turned so as to feed the strip forward to a given point and the cutting knife is positioned by this movement of the drum so as to cut the proper length strip to be wound on the coil, depending upon the diameter of the coil at the time the strip is fed thereto. The farther the cutting blade is positioned from the coil, the longer the strip, and the longer the strip, then the greater must be the movement of the drum in order to supply a sufficient length of paper to form the strip.

From the above, it will be apparent that I have provided a winding machine especially adapted for forming armature coils wherein the winding guide is automatically reversed through electrically controlled devices which operate with certainty and quickly, with no lost motion between actuated parts and results in the uniform placing of the wire to form the layers and the accurate positioning of the wire as it passes from one layer to the next succeeding layer. This same switch which controls the circuits for the reversing of the winding guide, also controls an electric circuit for causing the operation of the cutter, whereby the paper strip will be cut, released and fed to the coil at just the right time, so that as the wire is placed for the starting of the next succeeding layer, it will catch the end of the paper and cause the layer of insulating paper to be placed in the coil at just the right time.

My improved machine not only automatically produces armature coils which are uniform in shape and size and each properly constructed, but the forming of the coils is accomplished by comparatively few moving parts, thus reducing to a minimum the wear and tear on the machine and the power necessary for operating the same.

It will be noted that the continuously operating feeding rolls which convey the paper strip when severed to the coil are operated at a surface speed slightly less than the surface speed of the coil being wound, so that these rolls will place a drag on the paper and cause the same to be rolled tightly into the coil.

The resetting of the machine for the winding of the next coil is effected in the following manner. The starting switch indicated at 307 is thrown to open position. The stop lever 148 is then swung so as to lift the bent end 147 from the notch in the stop disk. This movement of the stop lever interrupts the circuit which has caused the brake to be applied to the spool and also establishes the circuit through the brushes 149ª and 149ᵇ. After the end of the stop lever has been released from the notch, the cam 139 is turned in a clock wise direction to bring the same back to the initial starting point which is determined by the stop 141 and the fixed finger 142. If the operator should try to turn this stop disk or cam 139 in a counter-clock wise direction, the stop 141ª would soon strike the finger 142 and thus indicate to the operator that said disk or cam is being turned in the wrong direction. The pawls 190 and 202 are raised from their respective ratchets and the yoke carrying the cutter and the controlling cam is turned in a clock wise direction as viewed in Fig. 32, so as to bring the cutting mechanism back to the initial cutting position. The movements of the yoke may be limited by the inside shoulder of the yoke striking against the frame of the machine or against a suitable adjustable stop. The parts of the machine having thus been reset, the new core or coil bearing member is gripped by the spindle, the end of the wire fixed thereto and then the machine is started by closing the rheostat switch.

While I have shown a winding slide reciprocating back and forth and operated by an actuating lever, it will be understood that these parts may be varied as to construction without departing from the spirit of the invention set forth in certain of the claims. In other words, the pyramiding mechanism and the cutting mechanism may be utilized in connection with devices operating to guide the wire in various ways, the essential feature being that these mechanisms shall be controlled by the wire guiding device. It is also obvious that many changes in the details of the construction and the arrangement of the parts may be made without departing from the spirit of the invention as set forth in the appended claims.

Having thus described the invention, what is claimed as new is:—

1. A coil winding machine comprising a winding spindle carrying the core on which the coil is to be formed, guiding devices for placing the wire in layers on said core, and mechanism for giving a relative back and forth movement to the spindle and guiding devices endwise of the core, said mechanism including a rotatable shaft, magnetic clutches for causing said shaft to rotate first in one direction and then the other, an automatic spring-actuated switch member for causing first one clutch and then the other to be energized, and means whereby the relative movement of the spindle and the guiding devices will trip said automatic spring-actuated switch member at pre-determined times.

2. A coil winding machine comprising a winding spindle carrying the core on which the coil is to be formed, guiding devices for placing the wire in layers on said core, and mechanism for giving a relative back and forth movement to the spindle and guiding devices endwise of the core, said mechanism including a rotatable shaft, magnetic clutches for causing said shaft to rotate first in one direction and then the other, an automatic spring-actuated switch member for causing first one clutch and then the other to be energized, means whereby the relative movement of the spindle and the guiding devices will trip said automatic spring-actuated switch member at pre-determined times, and means for automatically placing a layer of insulating material between the layers of wire.

3. A coil winding machine comprising a winding spindle carrying the core on which the coil is to be formed, guiding devices for placing the wire in layers on said core, and mechanism for giving a relative back and forth movement to the spindle and guiding devices endwise of the core, said mechanism including a rotatable shaft, electrically controlled clutch members for causing said shaft to rotate first in one direction and then the other and a switch member for causing first one clutch member and then the other to be energized, means for automatically placing a layer of insulating material between the layers of wire, a cutting mechanism for cutting the insulating material into strips, and means controlled by said switch member for operating said cutting mechanism.

4. A coil winding machine comprising a winding spindle carrying the core on which the coil is to be formed, guiding devices for placing the wire in layers on said core, and mechanism for giving a relative back and forth movement to the spindle and guiding devices endwise of the core, said mechanism including a spring actuated reversing switch, magnetic clutches energized by said switch for causing a relative movement between the guiding devices and the winding spindle first in one direction and then the other and means operated by the relative movement of the spindle and the guiding devices for tripping said spring-actuated reversing switch at pre-determined times.

5. A coil winding machine comprising a winding spindle carrying the core on which the coil is to be formed, guiding devices for placing the wire in layers on said core, mechanism for giving a relative back and forth movement to the spindle and guiding devices endwise of the core, said mechanism including a spring actuated reversing switch and electrically controlled devices energized by said switch, for causing a relative movement between the guiding devices and the winding spindle first in one direction and then the other, and a paper feeding mechanism for laying a strip of paper between the layers of wire, said paper feeding mechanism being controlled by said reversing switch.

6. A coil winding machine comprising a winding spindle carrying the core on which the coil is to be formed, guiding devices for placing the wire in layers on said core, mechanism for giving a relative back and forth movement to the spindle and guiding devices endwise of the core, said mechanism including a spring actuated reversing switch and electrically controlled devices energized by said switch for causing a relative movement between the guiding devices and the winding spindle first in one direction and then the other, and a paper feeding mechanism having an electrically operated cutting knife controlled by said switch, for feeding strips of paper between the layers of wire.

7. A coil winding machine comprising a winding spindle carrying the core on which the coil is to be formed, guiding devices for placing the wire in layers on said core, and mechanism for giving a relative back and forth movement to the spindle and guiding devices endwise of the core, said mechanism including a rotating shaft, a member reciprocated by said shaft, magnetic clutches for causing the shaft to rotate first in one direction and then the other and a reversing switch for energizing first one clutch and then the other, said reversing switch being controlled by said reciprocating member.

8. A coil winding machine comprising a winding spindle carrying the core on which the coil is to be formed, guiding devices for placing the wire in layers on said core, and mechanism for giving a relative back and forth movement to the spindle and guiding devices endwise of the core, said mechanism including a reciprocating slide, a rotating shaft, a lever actuated by said shaft for moving said slide, electrically controlled clutch members for causing said shaft to rotate first in one direction and then the other and a reversing switch controlled by said slide, for energizing first one clutch member and then the other.

9. A coil winding machine comprising a winding spindle carrying the core on which the coil is to be formed, guiding devices for placing the wire in layers on said core, mechanism for giving a relative back and forth movement to the spindle and guiding devices endwise of the core, said mechanism including a reciprocating slide, a rotating shaft, a lever actuated by said shaft for moving said slide, electrically controlled clutch members for causing said shaft to rotate first in one direction and then the other, a spring actuated reversing switch for energizing first one clutch member and then the other, means for locking the switch against movement, tripping levers for releasing the switch for reversing the movement of the slide and spaced stops coöperating respectively with said tripping levers.

10. A coil winding machine comprising a winding spindle carrying the core on which the coil is to be formed, guiding devices for placing the wire in layers on said core, mechanism for giving a relative back and forth movement to the spindle and guiding devices endwise of the core, said mechanism including a reciprocating slide, a rotating shaft, a lever actuated by said shaft for moving said slide, electrically controlled clutch members for causing said shaft to rotate first in one direction and then the other, a spring actuated reversing switch for energizing first one clutch member and then the other, means for locking the switch against movement, tripping levers for releasing the switch for reversing the movement of the slide and spaced stops coöperating respectively with said tripping levers, and means for varying the distance between said stops for varying the widths of the layers forming the coil.

11. A coil winding machine comprising a winding spindle carrying the core on which the coil is to be formed, guiding devices for placing the wire in layers on said core, mechanism for giving a relative back and forth movement to the spindle and guiding devices endwise of the core, said mechanism including a reciprocating slide, a rotating shaft, a lever actuated by said shaft for moving said slide, electrically controlled clutch members for causing said shaft to rotate first in one direction and then the other, a spring actuated reversing switch for energizing first one clutch member and then the other, means for locking the switch against movement, tripping levers for releasing the switch for reversing the movement of the slide, spaced stops coöperating respectively with said tripping levers, and means for varying the distance between said stops for varying the widths of the layers forming the coil, said means for varying the position between the stops including devices for stopping the machine when a predetermined number of layers have been formed.

12. A coil winding machine comprising a winding spindle carrying the core on which the coil is to be formed, a reciprocating member, wire guiding devices carried by said member for directing the wire in layers on said core, and mechanism for moving said member back and forth in a direction parallel with the axis of the winding spindle, said mechanism including a rotating shaft, magnetic clutches for causing said shaft to rotate first in one direction and then the other and a reversing switch controlled by said reciprocating member for causing first one clutch and then the other to be energized.

13. A coil winding machine comprising a winding spindle carrying the core on which the coil is to be formed, a reciprocating member, wire guiding devices carried by said member for directing the wire in layers on said core, and mechanism for moving said member back and forth in a direction parallel with the axis of the winding spindle, said mechanism including a rotating shaft, electrically controlled clutch members for causing said shaft to rotate first in one direction and then the other, a spring actuated reversing switch, a locking lever for holding said switch from movement and means for releasing said locking lever to permit the spring to throw the reversing switch for reversing the movement of the member carrying the wire guiding devices.

14. A coil winding machine comprising a winding spindle carrying the core on which the coil is to be formed, a reciprocating member, wire guiding devices carried by said member for directing the wire in layers on said core, and mechanism for moving said member back and forth in a direction parallel with the axis of the winding spindle, said mechanism including a rotating shaft, electrically controlled clutch members for causing said shaft to rotate first in one direction and then the other, a reversing switch for energizing first one clutch member and then the other, a spring for actuating said reversing switch, said spring being put under tension by the movement of said member, a locking lever for holding the reversing switch from movement under the action of said spring, and means for releasing said lever to permit the switch to reverse the movement of said member.

15. A coil winding machine comprising a winding spindle carrying the core on which the coil is to be formed, a reciprocating member, wire guiding devices carried by said member for directing the wire in layers on said core, and mechanism for moving said member back and forth in a direction parallel with the axis of the winding spindle, said mechanism including a rotating shaft, electrically controlled clutch members for causing said shaft to rotate first in one direction and then the other, a reversing switch for energizing first one clutch member and then the other, a spring for actuating said reversing switch, said spring being put under tension by the movement of said member, a locking lever for holding the reversing switch from movement under the action of said spring, a tripping device carried by the member and operated to move said locking lever to release the switch and spaced stops coöperating with said tripping device.

16. A coil winding machine comprising a winding spindle carrying the core on which the coil is to be formed, a reciprocating slide, wire guiding devices carried by said slide for directing the wire in layers on said core, and mechanism for moving said slide back and forth in a direction parallel with the axis of the winding spindle, said mechanism including a rotating shaft, a lever connected to said slide and oscillated by said shaft, electrically controlled clutch members for causing said shaft to rotate first in one direction and then the other, a reversing switch for energizing first one clutch member and then the other, a spring for actuating said reversing switch, said spring being put under tension by the movement of said slide, a locking lever for holding the reversing switch from movement under the action of said spring, tripping levers carried by the slide and operated to move said locking lever to release the switch, spaced stops coöperating respectively with said tripping levers, and means for automatically varying the distance between said stops for varying the widths of the layers forming the coil.

17. A coil winding machine comprising a winding spindle carrying the core on which the coil is to be formed, a reciprocating slide, wire guiding devices carried by said slide for directing the wire in layers on said core, and mechanism for moving said slide back and forth in a direction parallel with the axis of the winding spindle, said mechanism including a rotating shaft, a lever connected to said slide and oscillated by said shaft, electrically controlled clutch members for causing said shaft to rotate first in one direction and then the other, a reversing switch for energizing first one clutch member and then the other, a spring for actuating said reversing switch, said spring being put under tension by the movement of said slide, a locking lever for holding the reversing switch from movement under the action of said spring, tripping levers carried by the slide and operated to move said locking lever to release the switch, spaced stops coöperating respectively with said tripping levers, a counting cam operated step by step by devices actuated by said lever for varying the distance between said stops.

18. A coil winding machine comprising a winding spindle carrying the core on which the coil is to be formed, a reciprocating member, wire guiding devices carried by said member for directing the wire in layers on said core, and mechanism for moving said member back and forth in a direction parallel with the axis of the winding spindle, said mechanism including a rotating shaft, electrically controlled clutch members for causing said shaft to rotate first in one direction and then the other, a reversing switch for energizing first one clutch member and then the other, a spring for actuating said reversing switch, said spring being put under tension by the movement of said member, a locking lever for holding the reversing switch from movement under the action of said spring, a tripping device carried by the slide and operated to move said locking lever to release the switch, spaced stops coöperating with said tripping device, a counting cam operated step by step by devices actuated by said shaft for varying the distance between said stops, and a stop lever operated by said counting cam for stopping the machine when a predetermined number of layers have been formed.

19. A coil winding machine comprising a winding spindle carrying the core on which the coil is to be formed, wire guiding devices, a member carrying said wire guiding devices and movable back and forth in a direction parallel with said spindle, mechanism for moving said member first in one direction and then the other, said mechanism including a tripping device carried by the member, spaced stops coöperating with said trip device, a lever on which each stop is adjustably mounted, a cam for positioning the levers carrying the stops and means for moving said cam step by step when the trip device is out of engagement with the stops.

20. A coil winding machine comprising a winding spindle carrying the core on which the coil is to be formed, wire guiding devices, a member carrying said wire guiding devices and movable back and forth in a direction parallel with said spindle, mechanism for moving said member first in one direction and then the other, said mechanism including a trip device carried by the member, spaced stops coöperating with said trip device, a lever on which each stop is adjustably mounted, a cam for positioning the levers carrying the stops, means for moving said cam step by step when the trip device is out of engagement with the stops, and means whereby said cam may be returned to initial starting position, and a device for determining said initial starting position.

21. A coil winding machine comprising a winding spindle carrying the core on which the coil is to be formed, wire guiding devices, a slide carrying said wire guiding devices and movable back and forth in a direction parallel with said spindle, mechanism for moving said slide first in one direction and then the other, said mechanism including trip levers mounted on said slide, a spring connecting said trip levers, stop pins for limiting the movement of said trip levers, a stop associated with each trip lever, a lever on which each stop is adjustably mounted, a ratchet wheel, a cam carried by the ratchet wheel and engaging the levers carrying the stops for positioning said stops, a pawl for engaging said ratchet wheel for turning the cam step by step.

22. A coil winding machine comprising a winding spindle carrying the core on which the coil is to be formed, wire guiding devices, a slide carrying said wire guiding devices and movable back and forth in a direction parallel with said spindle, mechanism for moving said slide first in one direction and then the other, said mechanism including trip levers mounted on said slide, a spring connecting said trip levers, stop pins for limiting the movement of said trip levers, a stop associated with each trip lever, a lever on which each stop is adjustably mounted, a ratchet wheel, a cam carried by the ratchet wheel and engaging the levers carrying the stops for positioning said stops, a pawl for engaging said ratchet wheel for turning the cam step by step, and means whereby said cam may be returned to initial starting position and devices for determining said initial starting position.

23. A coil winding machine comprising a winding spindle carrying the core on which the coil is to be formed, wire guiding devices, a slide carrying said wire guiding devices and movable back and forth in a direction parallel with said spindle, mechanism for moving said slide first in one direction and then the other, said mechanism including trip levers mounted on said slide, a spring connecting said trip levers, stop pins for limiting the movement of said trip levers, a stop associated with each trip lever, a lever on which each stop is adjustably mounted, a ratchet wheel, a cam carried by the ratchet wheel and engaging the levers carrying the stops for positioning said stops, a pawl for engaging said ratchet wheel for turning the cam step by step, a disk movable with said ratchet wheel and having a notch therein, a stop lever having a projection adapted to engage said notch, and means controlled by said stop lever, for stopping the machine when said projection drops in said notch.

24. A winding machine comprising a winding spindle carrying the core on which the coil is to be formed, wire guiding devices, a slide on which said wire guiding devices are mounted, a rotating shaft, a worm gear carried thereby, a lever having a segmental gear meshing with said worm gear, said lever being connected to said slide, whereby the rotation of said shaft in one direction moves the slide for placing one layer of wire and the rotation of the shaft in the opposite direction, moves the slide for forming the next layer of wire, and means for reversing the movement of said shaft.

25. A winding machine comprising a winding spindle carrying the core on which the coil is to be formed, wire guiding devices, a slide on which said wire guiding devices are mounted, a rotating shaft, a worm gear carried thereby, a lever having a segmental gear meshing with said worm gear, said lever being connected to said slide, whereby the rotation of said shaft in one direction moves the slide for placing one layer of wire and the rotation of the shaft in the opposite direction, moves the slide for forming the next layer of wire, means for reversing the movement of said shaft, and a paper feeding mechanism for placing a layer of insulating paper between the layers of wire.

26. A winding machine comprising a winding spindle carrying the core on which the coil is to be formed, wire guiding devices, a slide on which said wire guiding devices are mounted, a rotating shaft, a worm gear carried thereby, a lever having a segmental gear meshing with said worm gear, said lever being connected to said slide, whereby the rotation of said shaft in one direction moves the slide for placing one layer of wire and the rotation of the shaft in the opposite direction, moves the slide for forming the next layer of wire, a paper feeding mechanism for placing a layer of insulating paper between the layers of wire, cutting mechanism for cutting the paper in strips of the required length and means for controlling the direction of movement of said shaft and said paper cutting mechanism.

27. A winding machine comprising a winding spindle carrying the core on which the coil is to be formed, wire guiding devices, a slide on which said wire guiding devices are mounted, a rotating shaft, a worm gear carried thereby, a lever having a segmental gear meshing with said worm gear, said lever being connected to said slide, whereby the rotation of said shaft in one direction moves the slide for placing one layer of wire and the rotation of the shaft in the opposite direction, moves the slide for forming the next layer of wire, a paper feeding mechanism for placing a layer of insulating paper between the layers of wire, said paper feeding mechanism having a cutting mechanism for cutting the paper in strips of the required length, electrical clutch members for controlling the rotation of said shaft, and a reversing switch controlled by said slide for energizing said clutch members for causing the operation of said paper cutting mechanism.

28. A winding machine comprising a winding spindle carrying the core on which the coil is to be formed, wire guiding devices, a slide on which said wire guiding devices are mounted, a rotating shaft, a worm gear carried thereby, a lever having a segmental gear meshing with said worm gear, said lever being connected to said slide, whereby the rotation of said shaft in one direction moves the slide for placing one layer of wire and the rotation of the shaft in the opposite direction, moves the slide for forming the next layer of wire, a paper feeding mechanism for placing a layer of paper between the layers of wire, means for varying the extent of movement of the paper feeding mechanism as the diameter of the coil formed, increases.

29. A winding machine comprising a winding spindle carrying the core on which the coil is to be formed, wire guiding devices, a slide on which said wire guiding devices are mounted, a rotating shaft, a worm gear carried thereby, a lever having a segmental gear meshing with said worm gear, said lever being connected to said slide, whereby the rotation of said shaft in one direction moves the slide for placing one layer of wire and the rotation of the shaft in the opposite direction, moves the slide for forming the next layer of wire, a paper feeding mechanism for placing a layer of paper between the layers of wire, means for varying the extent of movement of the paper feeding mechanism as the diameter of the coil formed, increases, a cutting mechanism including a cutting blade and means for shifting said cutting blade away from the spindle for cutting strips of increasing length.

30. A coil winding machine comprising a winding spindle carrying the core on which the coil is to be formed, a reciprocating slide, wire guiding devices mounted thereon, a worm gear movable with said winding spindle, a gear wheel meshing with said worm gear, a bevel gear carried by said gear wheel, a shaft, a worm gear on said last named shaft, a lever pivoted to said slide and having a segmental gear meshing with the worm gear on said last mentioned shaft, clutch members having bevel gears on said shaft meshing with the above mentioned bevel gear on opposite sides thereof, electric clutches for connecting the bevel gears on the shaft to said shaft, a reversing switch controlled by said slide for energizing first one electric clutch, whereby said shaft is rotated in one direction to move the slide to form one layer of wire and then in the opposite direction to move the slide to form another layer of wire.

31. A coil winding machine comprising a winding spindle carrying the core on which the coil is to be formed, a reciprocating slide, wire guiding devices mounted thereon, a worm gear movable with said winding spindle, a gear wheel meshing with said worm gear, a bevel gear carried by said gear wheel, a shaft, a worm gear on said last named shaft, a lever pivoted to said slide and having a segmental gear meshing with the worm gear on said last mentioned shaft, clutch members having bevel gears on said shaft meshing with the above mentioned bevel gear on opposite sides thereof, electric clutches for connecting the bevel gears on the shaft to said shaft, a reversing switch controlled by said slide for energizing first one electric clutch, whereby said shaft is rotated in one direction to move the slide to form one layer of wire and then in the opposite direction to move the slide to form another layer of wire, said controlling means for the reversing switch including devices for varying the time of reversing said switch, whereby layers of wire of gradually decreasing widths are formed.

32. A coil winding machine comprising a winding spindle carrying the core on which the coil is to be formed, a reciprocating slide, wire guiding devices mounted thereon and means for controlling the movements of said slide, including a reversing switch, a spring for operating the same, a locking lever for holding said switch in its extreme positions, tripping levers mounted on the slide, an adjustable screw carried by each trip lever and adapted to engage said locking lever, a spring connecting the trip levers, spaced stops between which the tripping levers move, a lever for each stop on which said stops are adjustably mounted, a cam for each lever, springs connecting the levers for holding the same in engagement with their respective cams and means for turning the cams to vary the position of the stops.

33. A coil winding machine comprising a winding spindle carrying the core on which the coil is to be formed, a reciprocating member, wire guiding devices carried thereby, magnetic clutches and devices operated thereby for moving said member in one direction when one of said clutches is energized and in the other direction when the other clutch is energized, a reversing switch having contact members, brushes associated with said switch and electrically connected with said clutches, said brushes being so disposed that when said switch is in one extreme position, one clutch is energized and when the switch is in the other extreme position, the other clutch is energized, a spring for shifting said switch and controlling devices associated with said reversing switch, whereby said reversing switch when released, may be quickly shifted by said spring.

34. A coil winding machine comprising a winding spindle carrying the core on which the coil is to be formed, a reciprocating member, wire guiding devices carried thereby, electrically controlled clutches and devices operated thereby for moving said member in one direction when one of said clutches is energized and in the other direction when the other clutch is energized, a reversing switch having contact members, brushes associated with said switch and electrically connected with said clutch members, said brushes being so disposed that when said switch is in one extreme position, one clutch is energized and when the switch is in the other extreme position, the other clutch is energized, a spring for shifting said switch, controlling devices associated with said reversing switch, whereby said reversing switch when released, may be quickly shifted by said spring, a paper feeding mechanism for placing a strip of insulating paper between the layers of wire, said paper feeding mechanism including a cutting mechanism, an electromagnet for controlling the same, a contact plate carried by said reversing switch and brushes associated therewith and connected to said electromagnet for operating the cutting mechanism, said contact plate being so disposed as to momentarily energize said electromagnet while said reversing switch is moving from one extreme position to the other.

35. A coil winding machine comprising a winding spindle carrying the core on which the coil is to be formed, a reciprocating member, wire guiding devices carried thereby, electrically controlled clutches and devices operated thereby for moving said member in one direction when one of said clutches is energized and in the other direction when the other clutch is energized, a reversing switch having contact members, brushes associated with said switch and electrically connected with said clutch members, said brushes being so disposed that when said switch is in one extreme position, one clutch is energized and when the switch is in the other extreme position, the other clutch is energized, a spring for shifting said clutches, controlling devices associated with said reversing switch, whereby said reversing switch when released, may be quickly shifted by said spring, a paper feeding mechanism for placing a strip of insulating paper between the layers of wire, said paper feeding mechanism including a cutting mechanism, an electromagnet for controlling the same, a contact plate carried by said reversing switch and brushes associated therewith and connected to said electromagnet for operating the cutting mechanism, said contact plate being so disposed as to momentarily energize said electromagnet while said reversing switch is moving from one extreme position to the other, said wire devices including an arm, means for shifting the arm if the wire breaks and a contact plate controlled by said arm for breaking the circuit through said switch when said arm is moved through the breaking of the wire.

36. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including guiding means for directing the strip of paper, a feeding drum for feeding the paper forward and cutting mechanism for cutting the paper in the desired length and means for varying the extent of movement of said drum as the diameter of the coil varies.

37. A coil winding machine comprising a winding spindle carrying the core on which the coil is to be formed, wire guiding devices, and means for actuating said spindle and wire guiding devices, whereby the wire is laid in layers, a paper feeding mechanism for placing a strip of insulating paper between the layers of wire, said paper feeding mechanism including guiding means for directing the strip of paper, a feeding drum for moving the strip forward, means for varying the extent of movement of said drum as the diameter of the layers vary, mechanism for cutting the strip and means for shifting the cutting mechanism so as to increase the length of the strip as the diameter of the coil increases.

38. A coil winding machine comprising a winding spindle carrying the core on which the coil is to be formed, wire guiding devices and means for actuating said spindle and wire guiding devices, whereby the wire is laid in layers and paper feeding mechanism for placing a strip of insulating paper between the layers of wire, said paper feeding mechanism including means for cutting the strip of paper and continuously rotating means frictionally engaging the strip between the cutting means and the winding spindle, for advancing the strip when severed, so that the end thereof is caught beneath the wire being wound upon the core and means for shifting the cutting mechanism so as to increase the length of the strip as the diameter of the coil increases.

39. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a cutting mechanism for cutting the strip into lengths, a feeding drum for feeding the strip forward into position to be cut and continuously rotating means frictionally engaging the paper strip for feeding the cut length forward as soon as it is severed from the remainder of the strip and means for shifting the cutting mechanism so as to increase the length of the strip as the diameter of the coil increases.

40. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a feeding drum for feeding the strip forward, a cutting mechanism for cutting the strip, said drum having a ratchet wheel, an oscillating pawl engaging the ratchet wheel to move the drum and shiftable means for holding said actuating pawl out of contact with said ratchet wheel for a portion of its stroke, whereby the extent of movement of the drum may be varied.

41. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a feeding drum for advancing the strip, a ratchet wheel connected to the drum, a pawl engaging the ratchet wheel, a cam plate adapted to hold the pawl out of engagement with the ratchet during a portion of its stroke, means for shifting the cam plate step by step in the opposite direction from the direction of movement of the drum and a cutting mechanism movable with said cam plate.

42. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a paper feeding drum, a ratchet wheel carried by the drum, a pawl for engaging said ratchet, an oscillating arm carrying said pawl, a cam plate located beside said ratchet and adapted to hold the pawl out of engagement with the ratchet during a portion of its movement, said cam plate having ratchet teeth formed thereon, a pawl engaging said ratchet teeth, an arm carrying said pawl, a spring for moving said last named arm to move the cam plate and a stop for limiting the movement of the arm, an adjustable screw carried by said arm and adapted to engage the arm carrying the pawl for moving the drum so that as said drum is moved to feed the paper, said cam plate is turned one step in the opposite direction, so that the next effective stroke of the drum feeding pawl, will be lengthened.

43. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a paper feeding drum, a ratchet wheel carried by the drum, a pawl for engaging said ratchet, an oscillating arm carrying said pawl, a cam plate located beside said ratchet and adapted to hold the pawl out of engagement with the ratchet during a portion of its movement, said cam plate having ratchet teeth formed thereon, a pawl engaging said ratchet teeth, an arm carrying said pawl, a spring for moving said last named arm to move the cam plate and a stop for limiting the movement of the arm, an adjustable screw carried by said arm and adapted to engage the arm carrying the pawl for moving the drum so that as said drum is moved to feed the paper, said cam plate is turned one step in the opposite direction, so that the next effective stroke of the drum feeding pawl, will be lengthened, a cutting mechanism movable with said cam plate, whereby the length of successive strips severed by the cutting mechanism will be increased.

44. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a guiding chute for the strip of paper, a feeding drum for feeding the strip of paper into said guiding chute, a continuously rotating paper feeding roll located above the chute, said chute having an opening therein and a coöperating roll located in said opening and means for severing the strip mechanism for cutting the strip, and means for shifting the cutting mechanism so as to increase the length of the strip as the diameter of the coil increases.

45. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a feeding drum, a shiftable yoke having a guiding channel for the paper strip, a fixed cutting blade carried by said yoke, a movable cutting blade mounted on said yoke, means for feeding the strip forward when severed and means for raising the severed end of the strip, whereby the same may be fed forward into said guiding channel.

46. A coil winding machine comprising a winding spindle carrying the core on which the coil is to be formed, wire guiding devices and means for actuating said spindle and wire guiding devices, whereby the wire is laid in layers, a paper feeding mechanism for placing a strip of insulating paper between the layers of wire, said paper feeding mechanism including a feeding drum, means for intermittently operating the same to feed a strip of paper forward, a gear carried by said drum, a roller and a gear connected to said roller and meshing with the gear on the drum and means for supporting the roller whereby the same coöperates with the drum in feeding the strip forward and means for varying the feed stroke of the drum.

In testimony whereof I affix my signature.

WILLIAM GRUNOW.